United States Patent
Kuroki

(10) Patent No.: US 9,370,909 B2
(45) Date of Patent: Jun. 21, 2016

(54) PNEUMATIC TIRE AND PRODUCTION METHOD THEREFOR

(71) Applicant: SUMITOMO RUBBER INDUSTRIES, LTD., Chuo-ku, Kobe-shi, Hyogo (JP)

(72) Inventor: Takeshi Kuroki, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 539 days.

(21) Appl. No.: 13/863,788

(22) Filed: Apr. 16, 2013

(65) Prior Publication Data
US 2013/0284331 A1   Oct. 31, 2013

Related U.S. Application Data

(62) Division of application No. 12/742,404, filed as application No. PCT/JP2008/070679 on Nov. 13, 2008, now abandoned.

(30) Foreign Application Priority Data

Nov. 21, 2007   (JP) .................................. 2007-301992
Dec. 20, 2007   (JP) .................................. 2007-328924

(51) Int. Cl.
 *B29D 30/60*   (2006.01)
 *B60C 19/08*   (2006.01)
(Continued)

(52) U.S. Cl.
 CPC ........ *B29D 30/0681* (2013.01); *B29D 30/3028* (2013.01); *B29D 30/60* (2013.01); *B29D 30/68* (2013.01); *B60C 11/00* (2013.01); *B60C 11/005* (2013.01); *B60C 11/0058* (2013.04);
(Continued)

(58) Field of Classification Search
 CPC .. B29D 2030/526; B29D 30/60; B60C 19/08; B60C 11/0058; B60C 19/082; B60C 2011/0091; B60C 11/0075
 See application file for complete search history.

(56) References Cited

U.S. PATENT DOCUMENTS 5,942,069 A     8/1999  Gerresheim et al.
2002/0007893 A1* 1/2002  Koyama ................. B29D 30/60
                                         152/548
(Continued)

FOREIGN PATENT DOCUMENTS

DE   102006019262 A1   10/2007
EP       1175992 A2    1/2002
(Continued)

OTHER PUBLICATIONS

Machine translation for Japan 2007-191020 (no date).*
(Continued)

*Primary Examiner* — Steven D Maki
(74) *Attorney, Agent, or Firm* — Birch, Stewart, Kolasch & Birch, LLP

(57) ABSTRACT

A pneumatic tire capable of discharging static electricity from a vehicle to a road surface wherein the pneumatic tire includes a base portion, a cap portion and a conductive portion, wherein the base portion is formed by spirally winding a ribbon-like rubber strip continuously from one tread edge side to the other tread edge side, without interrupting, with a gap portion formed by separating the side edges of adjacent ribbon-like rubber strips, and wherein the gap portion is formed such that the ribbon-like rubber strip is locally bent.

12 Claims, 21 Drawing Sheets

(51) Int. Cl.
  *B29D 30/06*  (2006.01)
  *B29D 30/30*  (2006.01)
  *B29D 30/68*  (2006.01)
  *B60C 11/00*  (2006.01)
  *B29D 30/52*  (2006.01)

(52) U.S. Cl.
  CPC ........... *B60C19/08* (2013.01); *B29D 2030/526* (2013.01); *B60C 11/0075* (2013.04); *B60C 19/082* (2013.04); *B60C 2011/0091* (2013.04)

(56) References Cited

U.S. PATENT DOCUMENTS

| | | |
|---|---|---|
| 2002/0185210 A1 | 12/2002 | Poulbot |
| 2006/0096697 A1 | 5/2006 | Miki |
| 2006/0174986 A1* | 8/2006 | Ogawa .................. B29D 30/60 152/152.1 |
| 2007/0017615 A1 | 1/2007 | Nobuchika et al. |
| 2007/0163690 A1 | 7/2007 | Nobuchika et al. |
| 2009/0095390 A1 | 4/2009 | Frerichs |

FOREIGN PATENT DOCUMENTS

| | | | |
|---|---|---|---|
| EP | 1645442 | A1 | 4/2006 |
| JP | 9-71112 | A | 3/1997 |
| JP | 2000-94542 | A | 4/2000 |
| JP | 2000-343916 | A | 12/2000 |
| JP | 2001-47525 | A | 2/2001 |
| JP | 2003-311742 | A * | 11/2003 |
| JP | 2004-338621 | A | 12/2004 |
| JP | 2006-137067 | A | 6/2006 |
| JP | 2007-8388 | A | 1/2007 |
| JP | 2007-176437 | A | 7/2007 |
| JP | 2007-191020 | A * | 8/2007 |
| JP | 2007-290485 | | 11/2007 |
| WO | WO-2005/108048 | A1 * | 11/2005 |

OTHER PUBLICATIONS

Machine translation for Japan 2003-311742 (no date).*
Extended European Search Report, dated Apr. 27, 2011, for European Application No. 08852804.7.

* cited by examiner

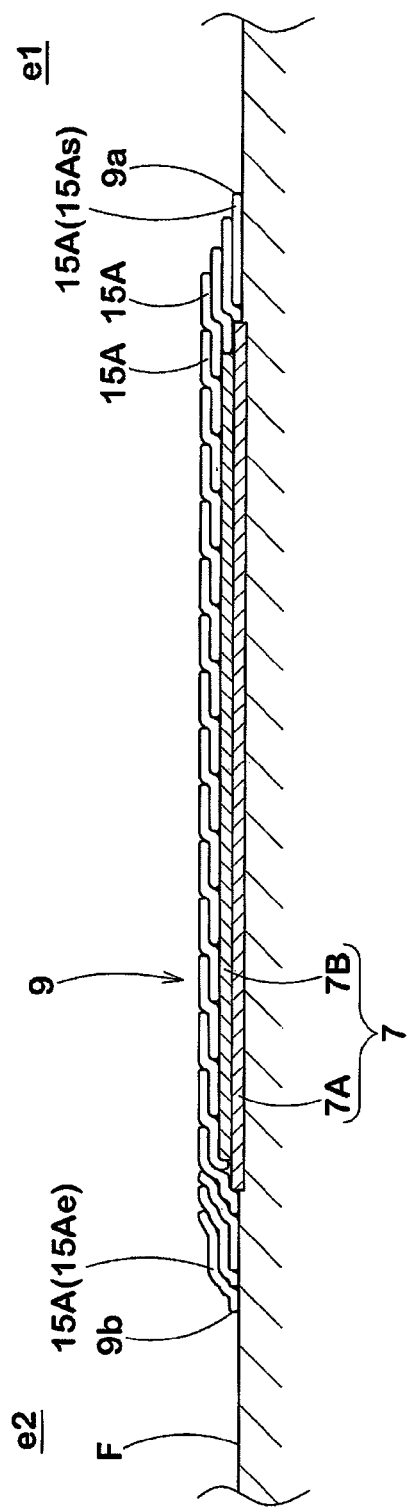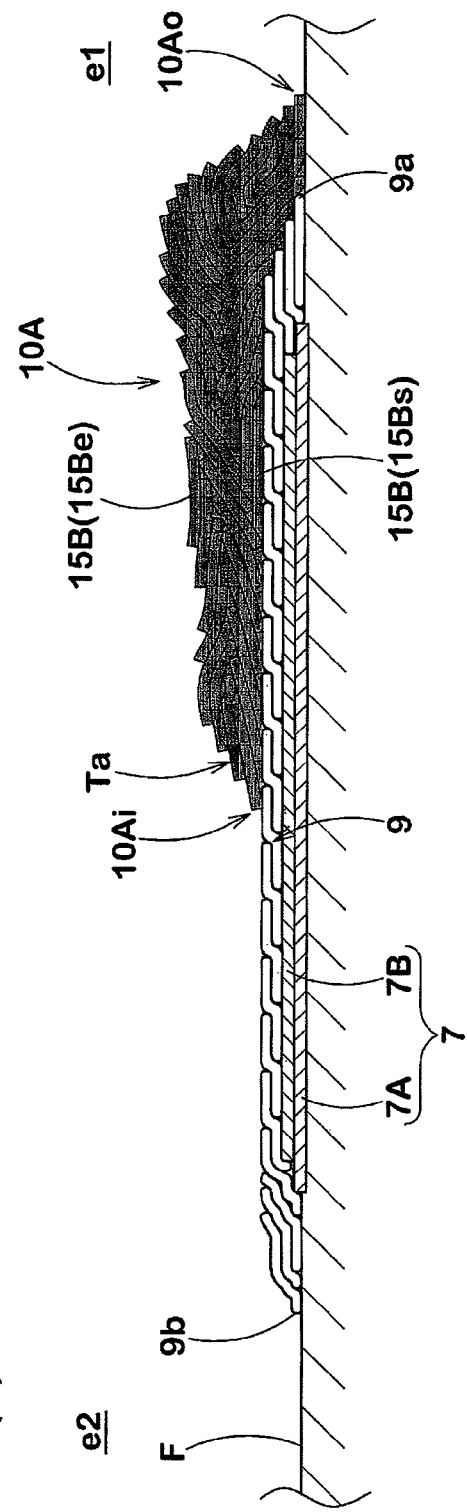

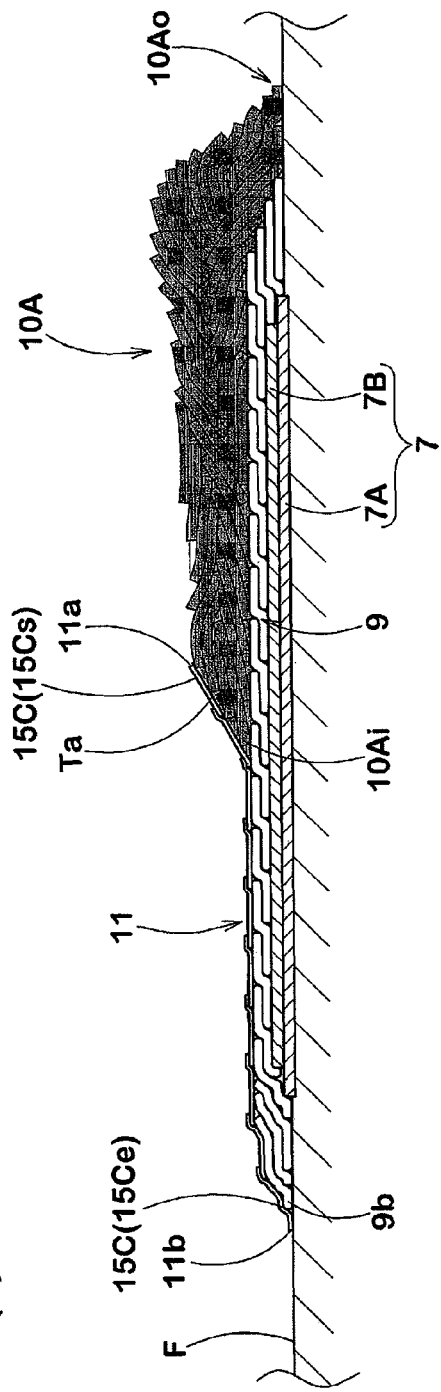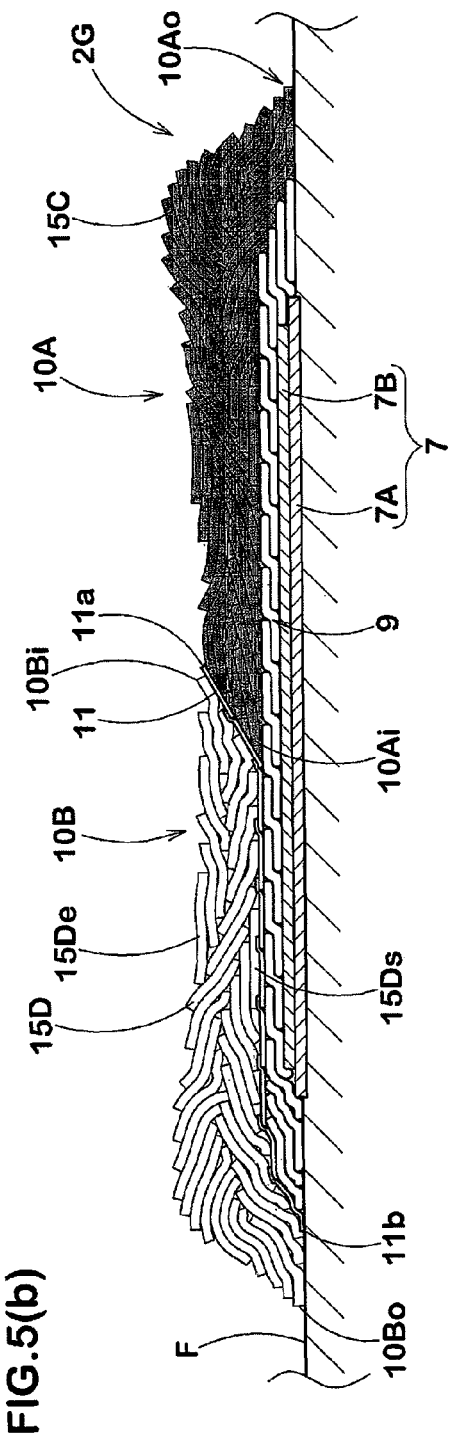
FIG.5(a)
FIG.5(b)

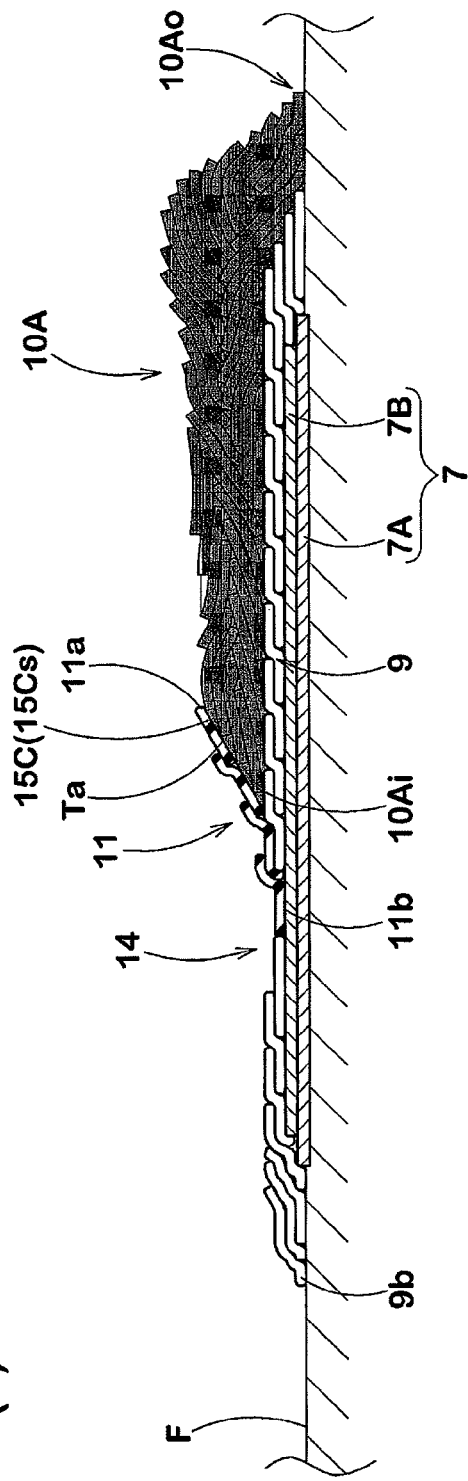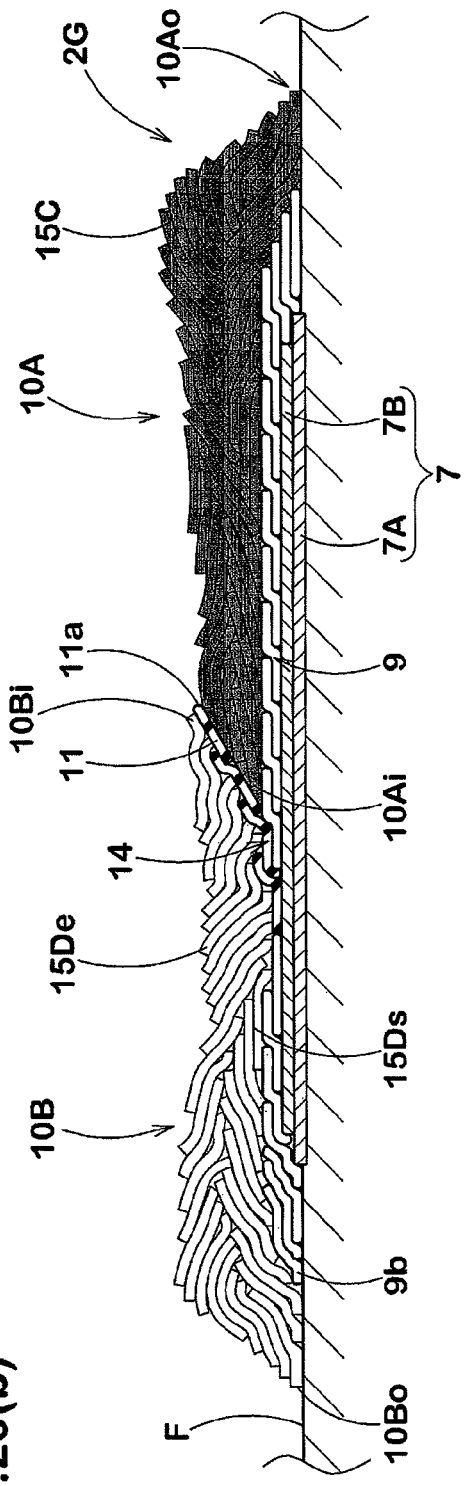

PNEUMATIC TIRE AND PRODUCTION METHOD THEREFOR

CROSS REFERENCE

The present application is a 37 C.F.R. §1.53(b) divisional of, and claims priority to, U.S. application Ser. No. 12/742,404, filed May 11, 2010. Application Ser. No. 12/742,404 is the national phase under 35 U.S.C. §371 of International Application No. PCT/JP2008/070679, filed on Nov. 13, 2008. Priority is also claimed to Japanese Application No. 2007-301992 filed on Nov. 21, 2007 and Japanese Application No. 2007-328924 filed on Dec. 20, 2007. The entire contents of each of these applications is hereby incorporated by reference.

TECHNICAL FIELD

The present invention relates to a pneumatic tire being capable of discharging static electricity in a vehicle to a road surface, and to a method for manufacturing the same.

BACKGROUND ART

In recent years, a large amount of silica is incorporated in a tread rubber of a pneumatic tire. Silica has a merit that it reduces rolling resistance and enhances wet grip performance of the tire. However, since silica has a poor conductivity, electric resistance of the tread rubber is increased. Such a tire tends to accumulate static electricity in a vehicle and to cause radio interference such as a radio noise.

In order to prevent the accumulation of static electricity in a vehicle, for example, a tread rubber (a) as shown in FIG. 25 is proposed. The tread rubber (a) has a double layer structure including a base portion (c) located on a radially inner side and a cap portion (b) disposed radially outward of the base portion. To enhance a driving performance and the like of the tire, the base portion (c) and the cap portion (b) are made of a non-conductive rubber containing a large amount of silica. Moreover, the base portion (c) and the cap portion (b) are each divided into right and left parts, and a through-terminal portion (d) made of, for example, a conductive rubber containing a large amount of carbon is disposed between them.

The through-terminal portion (d) continuously extends in the tire circumferential direction, and a radially outer surface of the through-terminal portion (d) constitutes a part of a ground-contacting surface (g). A radially inner surface of the through-terminal portion (d) is connected to a tread reinforcing cord layer (f), such as a belt layer, which is electrically conducted with a rim (not shown) through a sidewall rubber or the like when the tire is mounted on the rim. Such a tread rubber (a) can discharge static electricity accumulated in a vehicle to a road through the rim, the sidewall rubber, the tread reinforcing cord layer (f), and the through-terminal portion (d).

However, in the tread rubber (a) shown in FIG. 25, the base portion (c) is completely divided into the right and left sides. In other words, in the tread rubber (a) described above, a region where the base portion (c) having a low rolling resistance is not present is continuously formed in the circumferential direction of the tire. In such a tread rubber (a), an effect for reducing the rolling resistance of the tire cannot be expected sufficiently.

In a case where the base portion (c) is completely divided into the right and left sides, a pasting position of the base portion (c) is prone to be deviated when the tread rubber (a) is formed. This may deteriorate uniformity of the tire. The following publications show related arts:

Patent Literature 1: JP-A-9-71112
Patent Literature 2: JP-A-2000-94542

DISCLOSURE OF THE INVENTION

Problem to be Solved by the Invention

The present invention has been made in view of such circumstances. A first invention is based on that the cap portion of the tread rubber is divided into left and right parts to give a first cap portion and a second cap portion, the base portion of the tread rubber is formed to continuously extend in a tread width direction, and a conductive portion which is made of a conductive rubber and one end of which forms a ground contact surface is disposed to extend between the first and second cap portions from the ground contact surface toward a radially inner side and further to extend between the base portion and one of the first and second cap portions in the tire axial direction to connect with the sidewall rubber or the like, thus providing a pneumatic tire having an excellent uniformity and a method for manufacturing the same.

A second invention is based on that the base portion of the tread rubber is formed by spirally winding a ribbon-like rubber strip to form, during the winding, a gap portion by separating both side edges of adjacent rubber strips, and a conductive portion having one end exposed on the ground contact surface is connected from the gap portion to a conductive tread-reinforcing cord layer, thereby ensuring a conductive path without completely dividing the base portion into right and left parts, thus providing a pneumatic tire excellent in rolling resistance and uniformity and a method for manufacturing the same.

Means to Solve the Problem

The first invention provides a pneumatic tire comprising a toroidal carcass extending from a tread portion to bead cores in bead portions through sidewall portions, a tread reinforcing cord layer disposed radially outward of the carcass in the tread portion, and a tread rubber disposed radially outward of the tread reinforcing cord layer, the tread rubber including a base portion made of a non-conductive rubber containing silica which is disposed on a radially inner side and continuously extends from one tread edge side to the other tread edge side, a cap portion made of a non-conductive rubber containing silica which is disposed radially outward of the base portion to form a ground-contacting surface, and a conductive portion made of a conductive rubber having one end exposed on the ground-contacting surface and the other end connected to a sidewall rubber or a topping rubber of the carcass to form an electrical conductive path to a rim when the tire is mounted on the rim, wherein the cap portion includes a first cap portion and a second cap portion which are obtained by dividing the cap portion into left and right parts, and the conductive portion extends radially inwardly between the first cap portion and the second cap portion from the ground-contacting surface and further extends between the base portion and one of the first and second cap portions in the tire axial direction to connect with the sidewall rubber or the topping rubber.

As a method for manufacturing the pneumatic tire according to the first invention, there is provided a method comprising the steps of a tread rubber forming step for forming a tread rubber, and a vulcanizing step for vulcanizing a raw tire including the tread rubber, wherein the tread rubber forming step includes a stage for forming a base portion made of a non-conductive rubber containing silica which is disposed on a radially inner side and continuously extends from one tread edge side to the other tread edge side, a stage for forming a first cap portion made of a non-conductive rubber containing silica which is disposed radially outward of the base portion in an area on a side of one end of the base portion, the first cap portion extending from an axially outer end to an axially inner end having an outer surface tapered on the base portion to cover only the one end side area of the base portion, a stage for forming a conductive portion made of a conductive rubber, the conductive portion having one end exposed on a ground-contacting surface and extending in the opposite direction of the first cap port along the tapered outer surface and an outer surface of the base portion to have the other end at a location axially outward of the other end of the base portion, and a stage for forming a second cap portion made of a non-conductive rubber containing silica, the second cap portion covering an entire outer surface of the conductive portion except the exposed one end thereof and terminating at a location axially outward of the other end of the conductive portion.

According to the second invention, there is provided a pneumatic tire comprising a toroidal carcass extending from a tread portion to bead cores in bead portions through sidewall portions, a tread reinforcing cord layer disposed radially outward of the carcass in the tread portion and electrically conducted with a rim when the tire is mounted on the rim, and a tread rubber disposed radially outward of the tread reinforcing cord layer, the tread rubber including a base portion made of a non-conductive rubber containing silica and disposed radially outward of the tread reinforcing cord layer, a cap portion made of a non-conductive rubber containing silica and disposed radially outward of the base portion to form a ground-contacting surface, and a conductive portion made of a conductive rubber and having one end exposed on the ground-contacting surface and the other end connected to the tread reinforcing cord layer, wherein the base portion is formed by spirally winding a ribbon-shaped rubber strip from one tread edge side to the other tread edge side and it has a gap portion formed by separating side edges of adjacent rubber strips during the winding to expose the tread reinforcing cord layer at the gap portion, the cap portion is divided into right and left parts and comprises a first cap portion on one tread edge side and a second cap portion on the other tread edge side, and the conductive portion extends radially inwardly between the first cap portion and the second cap portion from the ground-contacting surface and is connected to the tread reinforcing cord layer at the gap portion of the base portion.

As a method for manufacturing the pneumatic tire according to the second invention, there is provided a method comprising the steps of a tread rubber forming step for forming a tread rubber, a vulcanizing step for vulcanizing a raw tire including the tread rubber, wherein the tread rubber forming step includes a stage for forming a base portion having a gap portion by spirally winding a ribbon-shaped non-conductive rubber strip containing silica around a radially outer side of the tread reinforcing cord layer from one tread edge side to the other tread edge side and separating side edges of adjacent rubber strips during the winding to form the gap portion at which the tread reinforcing cord layer is exposed, a stage for forming a first cap portion made of a non-conductive rubber containing silica radially outward of the base portion to extend from its axially outer end located on one end side of the base portion to near the gap portion so as to cover a region of the one end side of the base portion, a stage for forming a conductive portion made of a conductive rubber along an inner end portion of the first cap portion so as to have one end exposed on a ground-contacting surface and the other end connected to the tread reinforcing cord layer through the gap portion of the base portion, and a stage for forming a second cap portion made of a non-conductive rubber containing silica on an outer side of the base portion in a tire width direction and in a region of the other end side extending from the conductive portion to the other tread edge side.

In this specification, the term "conductive" means a characteristic that electricity substantially flows through a material, more specifically, a characteristic that a material having a volume electrical resistivity of less than $1.0 \times 10^8$ (ohm·cm) shows.

The term "non-conductive" means a characteristic that electricity does not substantially flow through a material, more specifically, a characteristic that a material having a volume electrical resistivity of not less than $1.0 \times 10^8$ (ohm·cm) shows.

The volume electrical resistivity is measured by an ohmmeter at a temperature of 25° C., a relative humidity of 50% and an applied voltage of 500 v, using a 150 mm×150 mm×2 mm specimen.

Effects of the Invention

In the pneumatic tire according to the first invention, the base portion of the tread rubber extends continuously without being divided into right and left parts in the tire axial direction. Further, the conductive portion extends radially inwardly from the ground contact surface through between the first cap portion and the second cap portion and further extends in the tire axial direction through between the base portion and one of the first cap portion and the second cap portion, and it is connected to the sidewall rubber or the topping rubber. Therefore, such a pneumatic tire can discharge static electricity accumulated in a vehicle to a road surface through the conductive portion. Further, since the base portion is continuous in the tire axial direction, forming precision of the tread rubber is enhanced and uniformity of the tire is also improved.

In the pneumatic tire according to the second invention, the base portion of the tread rubber is formed by a so-called strip wind method in which the ribbon-like rubber strip is spirally wound, and the base portion has the gap portion at which side edges of adjacent rubber to strips are separated from each other during the winding operation so that the tread reinforcing cord layer is exposed from the gap portion. The conductive portion extends radially inwardly from the ground contact surface between the first cap portion and the second cap portion, and is connected to the tread reinforcing cord layer through the is gap portion. Therefore, the base portion made of a rubber containing silica to have a low rolling resistance is formed without being divided completely into right and left in the tire axial direction. That is, a region where no base portion is present does not continues in the circumferential direction of the tire. According to such a tread rubber, it is possible to effectively prevent the rolling resistance and uniformity from being deteriorated.

BRIEF DESCRIPTION OF THE DRAWINGS

FIGS. 4(a) and 4(b) are sectional views for illustrating a tread rubber forming step of the first invention;

FIGS. 5(a) and 5(b) are sectional views for illustrating the tread rubber forming step of the first invention;

FIGS. 20(a) and 20(b) are sectional views for illustrating the step of forming the tread rubber according to the second invention;

EXPLANATION OF SYMBOLS

Figure 1:
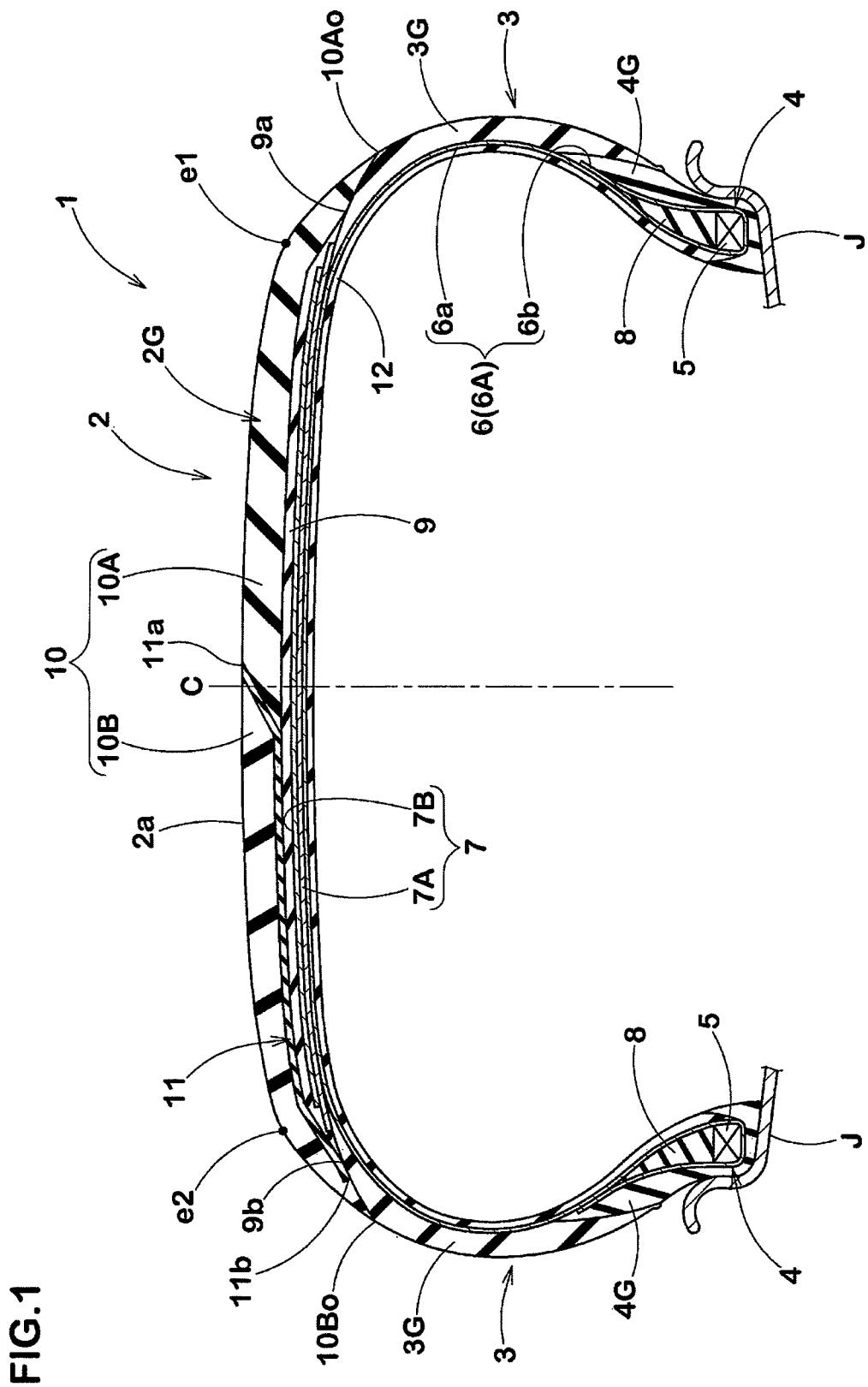
FIG. 1 is a sectional view of a pneumatic tire according to an embodiment of the first invention.

1. Pneumatic tire
2. Tread portion
2a. Ground contact surface
2G. Tread rubber
3. Sidewall portion
3G. Sidewall rubber
4. Bead portion
4G. Clinch rubber
5. Bead core
6. Carcass
7. Tread-reinforcing cord layer
9. Base portion
10. Cap portion
10A. First cap portion
10B. Second cap portion
11. Conductive portion
13. Protrusion
14. Gap portion
15, 15A, 15B, 15C, 15D. Rubber strip

BEST MODE FOR CARRYING OUT THE INVENTION

An embodiment of the present invention will be explained below with reference to the drawings.

[First Invention]

FIG. 1 is a sectional view of a pneumatic tire according to the first invention and the method for manufacturing thereof. The pneumatic tire 1 comprises a toroidal carcass 6 extending from a tread portion 2 to bead cores 5 in bead portions 4 through sidewall portions 3, and a tread reinforcing cord layer 7 disposed radially outward of the carcass 6 in the tread portion 2.

The carcass 6 is formed, for example, from one carcass ply 6A having a radial structure. The carcass ply 6A has, for example, a toroidal main portion 6a extending between the bead cores 5, 5 and a pair of turnup portions 6b that are continuous with both ends of the main portion 6a and are turned up around the bead cores 5 from the axially inside to the axially outside of the tire. Between the main portion 6a and the turned up portions 6b are disposed bead apex rubbers 8 extending radially outwardly from the bead cores 5.

The tread reinforcing cord layer 7 comprises at least two belt plies stacked, two belt plies 7A and 7B in this embodiment, of metal cords arranged at an angle of, for example, 15 to 40 degrees with respect to the tire circumferential direction. The tread reinforcing cord layer 7 may include, as occasion demands, a band layer (not shown) of organic fiber cords being arranged substantially parallel to the circumferential direction of the tire on radially outer side of the belt plies.

Each of the carcass ply 6A and belt plies 9A and 9B is constituted by a ply for tires comprising cords and a topping rubber for topping the cords. Each topping rubber abundantly contains carbon black as a filler. Accordingly, each topping rubber has a conductivity that the volume resistivity is less than $1.0 \times 10^8$ ($\Omega \cdot cm$).

A sidewall rubber 3G forming an outer surface of a tire in a sidewall region is disposed outward of the carcass 6. A radially outer end of the sidewall rubber 3G extends and terminates between the tread reinforcing cord layer 7 and the carcass 6.

A clinch rubber 4G contacting a rim J is disposed outward of the carcass 6 in a bead region. The clinch rubber 4G is connected to the sidewall rubber 3G.

These sidewall rubber 3G and clinch rubber 4G show a conductivity that the volume resistivity is less than $1.0 \times 10^8$ ($\Omega \cdot cm$), since they abundantly contain carbon black as a filler. An inner liner rubber 12 having an excellent air impermeability is disposed inward of the carcass 6

Further, a tread rubber 2G is disposed radially outward of the tread reinforcing cord layer 7. The tread rubber 2G in this embodiment comprises a base portion 9 made of a non-conductive rubber which is is disposed on a radially inner side, a cap portion 10 made of a non-conductive rubber which is disposed radially outward of the base portion 9 to form a ground contact surface 2a, and a conductive portion 11 made of a conductive rubber having one end exposed on the ground contact surface 2a and the other end which is connected to the sidewall rubber 3G or the topping rubber of the carcass 6 and which forms an electrical conductive path to a rim J when the tire is mounted on the rim J.

The term "ground contact surface 2a" of the tread portion 2 denotes an outer surface of the tread portion 2 which comes into contact with a flat surface when a tire is mounted on a normal rim and inflated to a normal inner pressure and this tire in the normal condition is then loaded with a normal load and is brought into contact with the flat surface at a camber angle of 0°. Axially outermost positions of the ground contact surface is defined as tread edges e1 and e2.

The term "normal rim" denotes a rim defined for every tire in a standardizing system on which the tire is based and is, for example, "standard rim" in JATMA, "Design Rim" in TRA and "Measuring Rim" in ETRTO.

The term "normal inner pressure" denotes an air pressure defined for every tire in the standardizing system and is, for example, the "maximum air pressure" in JATMA, the maximum value recited in the table of "Tire Load Limits at Various Cold Inflation Pressures" in TRA, and the "Inflation Pressure" in ETRTO". However, in case of tires for passenger cars, the "normal inner pressure" is 180 kPa.

The term "normal load" denotes a load defined for every tire in the standardizing system and is, for example, the maximum load capacity in JATMA, the maximum value recited in the table of "Tire Load Limits at Various Cold Inflation Pressures" in TRA, and the "Load Capacity" in ETRTO. However, in case of tires for passenger cars, the standard load is defined as a load corresponding to 88% of the load mentioned above.

In this embodiment, a silica-rich compounded rubber containing a large amount of silica is used for the base portion 9 and the cap portion 10. Such a silica-rich rubber enhances the wet grip performance in the cap portion 10, and reduces heat generation and rolling resistance in the base portion 9 to exhibit an excellent running performance. On the other hand, since a large amount of silica is incorporated, both the base portion 9 and the cap portion 10 have a non-conductive property.

Examples of rubber polymers for constituting the base portion 9 and the cap portion 10 are, for instance, natural rubber (NR), butadiene rubber (BR), styrene butadiene rubber (SBR), polyisoprene rubber (IR), nitrile rubber (NBR), chloroprene rubber (CR), and the like. These can be used alone or in combination thereof.

Silica to be incorporated in the base portion 9 and the cap portion 10 is not particularly limited, but silica having a nitrogen adsorption specific surface area (BET) of 150 to 250 m$^2$/g and having such a colloidal property as a dibutyl phthalate (DBP) absorption capacity of at least 180 ml/100 g is preferred from the viewpoints of rubber-reinforcing effect and rubber processability.

As a silane coupling agent are suitably used bis(triethoxysilyl-propyl) tetrasulfide and a-mercaptopropyltrimethoxysilane.

In order to achieve both the low rolling resistance and the wet performance on a higher level, it is preferable that the amount of silica incorporated in the base portion 9 and the cap portion 10 is not less than 30 parts by mass, especially not less than 40 parts by mass, per 100 parts by mass of the rubber polymer, and is not more than 100 parts by mass, especially not more than 80 parts by mass, more especially not more than 60 parts by weight, per 100 parts by mass of the rubber polymer.

It is needless to say that carbon black may be supplementarily incorporated in the base portion 9 and the cap portion 10 in addition to silica. Carbon black is helpful for adjusting other physical properties of rubber such as elastic modulus, hardness and like. In this case, the amount of carbon black is less than the amount of silica and is preferably at most 15 parts by mass, more preferably at most 10 parts by mass, per 100 parts by mass of the rubber polymer. If the amount of carbon black is more than 15 parts by mass, the low rolling resistance based on silica is impaired and, in addition, the rubber tends to become excessively hard.

The base portion 9 is superposed on the tread reinforcing cord layer 7, and it extends continuously from one tread edge e1 to the other tread edge e2 without interruption. The base portion 9 in the present embodiment has an axial width greater than a width of the tread reinforcing cord layer 7 so as to completely cover the tread reinforcing cord layer 7. Therefore, both axially outer ends 9a and 9b of the base portion 9 are located axially outward of the ends of the tread reinforcing cord layer 7. Each of the ends 9a and 9b of the base portion 9 is tapered and is connected to, for example, the sidewall rubber 3G.

The cap portion 10 is composed of a first cap portion 10A and a second cap portion 10B which are divided into right and left. In this embodiment, the first cap portion 10A is disposed on one tread edge e1 side with respect to the tire equator C (right side in FIG. 1), and the second cap portion 10B is disposed on the other tread edge e2 side with respect to the tire equator C (left side in FIG. 1). Axially outer ends 10Ao and 10Bo of the cap portions 10A and 10B are each located axially outward of the tread edges e1 and e2, especially outward of the outer end 9a or 9b of the base portion 9. That is, the ground-contact surface 2a except the conductive portion 11 is formed by radially outer surfaces of the first cap portion 10A and the second cap portion 10B.

Figure 2:
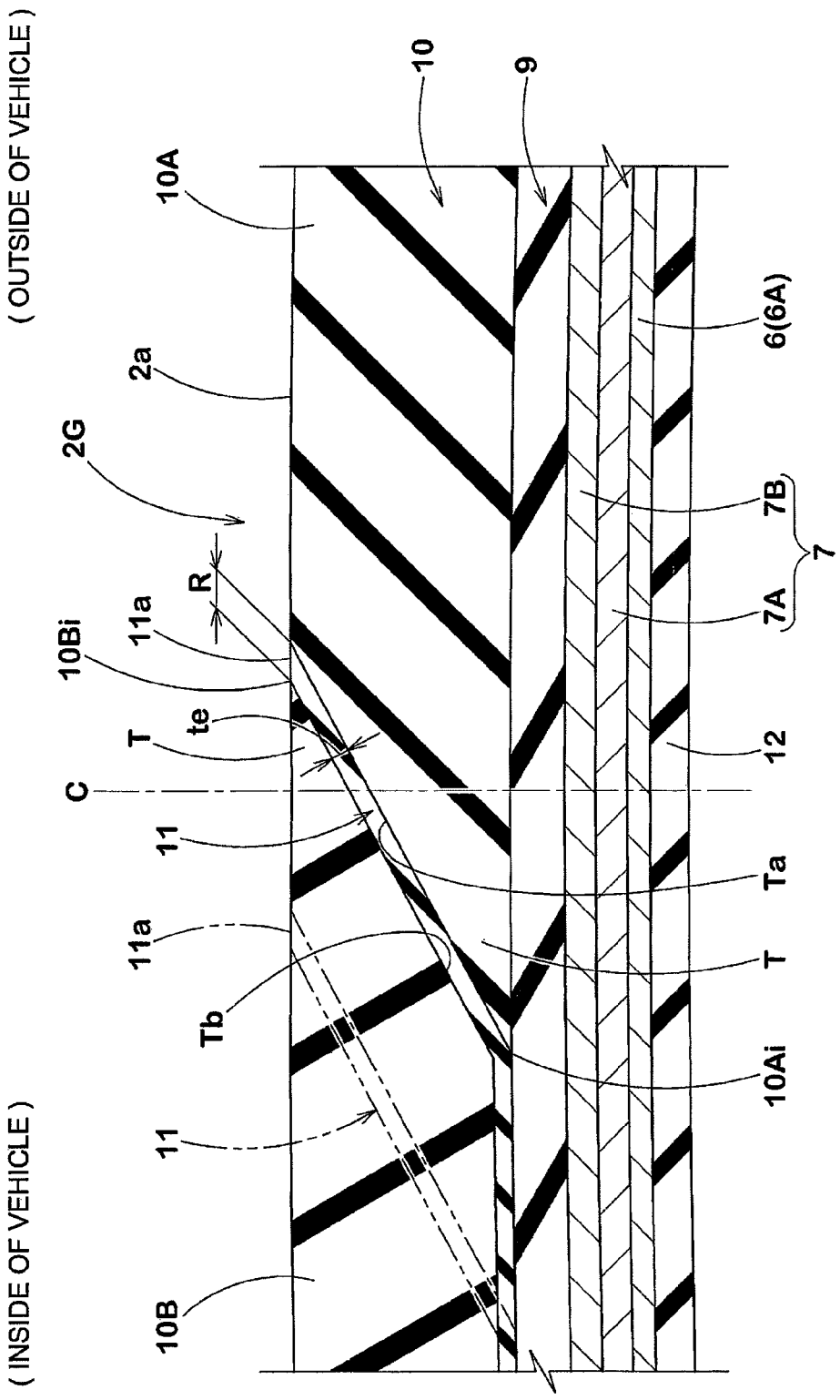
FIG. 2 is a partially enlarged view of a tread portion shown in FIG. 1.

As shown in FIG. 2 in an enlarged form, each of the cap portions 10A and 10B includes a tapered portion T the thickness of which is gradually reduced toward respective inner end 10Ai or 10Bi. The first cap portion 10A has a tapered outer surface Ta on a radially outer side thereof. On the other hand, the second cap portion 10B has a tapered inner surface Tb on a radially inner side thereof. These tapered surfaces Ta and Tb are facing each other.

The conductive portion 11 is made of a conductive rubber. As such a rubber composition, for example, a carbon rich rubber composition is suitable, but those containing a conductive powder (e.g., metal powder) instead of carbon or together with carbon may also be used. One end 11a of the conductive portion 11 located on the radially outer side is exposed on the ground contact surface 2a. In this embodiment, the one end 11a of the conductive portion 11 is exposed on the ground contact surface 2a to extend continuously in the circumferential direction of the tire. Thus, the conductive portion 11 can come into contact continuously with a road surface during running of the tire. Further, since the conductive portion 11 in this embodiment is provided approximately near the tire equator C, the conductive portion 11 can come into contact with a road not only during straight running but also during cornering.

The conductive portion 11 extends radially inwardly from the one end 11a exposed on the ground-contact surface 2a through between the first cap portion 10A and the second cap portion 10B, that is, between the tapered outer surface Ta and the tapered inner surface Tb. In this embodiment, the conductive portion 11 extends along the tapered surfaces and further extends axially outwardly between the second cap portion 10B and the base portion 9. The other end 11b of the conductive portion 11 extends axially outwardly beyond the other outer end 9b of the base portion 9 and is connected to the sidewall rubber 3G to terminate there. Therefore, in the pneumatic tire 1 in this embodiment, the rim J and the conductive portion 11 are electrically connected through the sidewall rubber 3G and the clinch rubber 4G when the pneumatic tire 1 is mounted on the rim J. The other end 11b of the conductive portion 11 is covered with the second cap portion 10B.

According to the pneumatic tire as mentioned above, static electricity accumulated in a vehicle is discharged to a road through the rim J, the clinch rubber 4G, the sidewall rubber 3G and the conductive portion 11. Therefore, trouble such as radio noise is improved. Further, since the base portion 9 of the tread rubber 2G is continuous in the tire axial direction without interruption, the forming precision of the tread rubber 2G is improved to remarkably improve uniformity of the tire.

To sufficiently exhibit such a conduction effect, the thickness "te" of the conductive portion 11 is preferably not less than 0.3 mm, more preferably not less than 0.5 mm. Similarly, an exposed width R of the conductive portion 11 exposed on the ground-contact surface 2a is preferably not less than 0.5 mm, more preferably not less than 0.7 mm. On the other hand, if the thickness "te" or the exposed width R of the conductive portion 11 is extremely increased, performances of the tread rubber 2G such as wet performance and low rolling resistance tend to deteriorate. From such a viewpoint, the thickness "te" of the conductive portion 11 is preferably not more than 5 mm, more preferably not more than 3 mm. Similarly, the exposed width R of the conductive portion 11 is preferably not more than 7 mm, more preferably not more than 4 mm.

The conductive portion 11 tends to be inferior in wear resistance to the first and second cap portions 10A and 10B. Therefore, it is preferable to place on the pneumatic tire 1 a mark for a direction of attaching the tire to a vehicle, and to dispose the above-mentioned one end 11a of the conductive portion 11 which is exposed on the ground-contact surface 2a, on a vehicle inner side with respect to the tire equator C as shown by an imaginary line in FIG. 2. With this, the conductive portion 11 can be shifted away as much as possible from a large lateral force generated in a tread ground-contact surface on the outer side of the vehicle during cornering, so early wearing of the conductive portion 11 can be suppressed.

Further, it is preferable that the conductive portion 11 extends from the one end 11a toward the radially inner side of the tire while tilting to the vehicle inner side, whereby as the tread portion is worn, the position of the one end 11a of the conductive portion 11 exposed on the ground-contact surface can be further shifted toward the inner side of vehicle.

Indication of the mounting direction of tire to a vehicle is made, for example, in such a manner that a mark (e.g., "INSIDE") meaning inner side of vehicle is placed on one sidewall portion 3, and a mark (e.g., "OUTSIDE") meaning outer side of vehicle is placed on the other sidewall portion 3.

Figure 3:
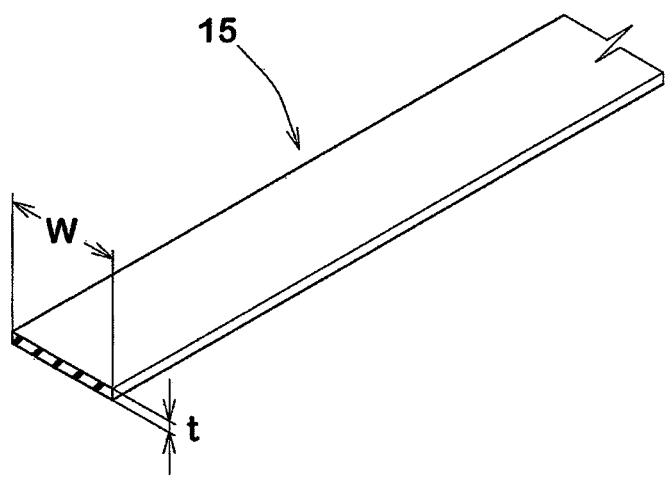
FIG. 3 is a perspective view showing one example of a rubber strip.

The conductive portion 11 is preferably formed of a strip laminated body which is formed by spirally winding a ribbon-like rubber strip 15 as shown in FIG. 3. An embodiment of a method for manufacturing such a pneumatic tire 1 will be described concretely.

According to one embodiment, all members constituting the tread rubber 2G, i.e., base portion 9, cap portion 10 and conductive portion 11, are formed by spirally winding an unvulcanized ribbon-like rubber strip 15 with a narrow-width as shown in FIG. 3. Here, the term "unvulcanized" means a rubber state that vulcanization is not completed perfectly. Thus, a rubber which has been merely preliminarily vulcanized belongs to the unvulcanized rubber.

The rubber strip 15 is in the form of a ribbon having a rectangular cross section with a width W greater than its thickness "t". The width W and the thickness "t" of the rubber strip are not especially limited, but the width W of the rubber strip is preferably in a range of from 5 to 50 mm and the thickness "t" is preferably in a range of from 0.5 to 3 mm. When the width W of the rubber strip is less than 5 mm or when the thickness "t" is less than 0.5 mm, the rubber strip tends to break when it is spirally wound and, in addition, there is a possibility that the number of windings is remarkably increased, thus lowering the productivity. When the width W of the rubber strip exceeds 50 mm or when the thickness "t" exceeds 3 mm, there is a tendency that it is difficult to precisely form a desirable cross section by winding the rubber strip.

FIGS. 4 and 5 show a tread rubber forming step for forming the tread rubber 2G in time series.

In the tread rubber forming step, firstly, a stage of forming the base portion 9 is carried out by, as shown in FIG. 4(a), spirally winding a rubber strip 15A having a non-conductivity based on a silica-rich compounding around the tread reinforcing cord layer 7 previously wound around a cylindrical forming former F. More specifically, a winding-start end 15As of the rubber strip 15A is fixed to the forming former F on an axially outer side of the tread reinforcing cord layer 7 on the one tread edge e1 side. Then, while the forming former F is rotated, the rubber strip 15 is moved toward the other tread edge e2 side at a predetermined speed, whereby the rubber strip 15A is spirally wound around the forming former F. At that time, side edges of the rubber strips 15A are preferably overlapped each other.

A winding-finish end 15Ae of the rubber strip 15A is fixed onto the forming former F at a position located axially outward of the tread reinforcing cord layer 7, whereby the base portion 9 is formed so as to completely cover the tread reinforcing cord layer 7. The thickness of the base portion 9 can freely be set by adjusting the number of windings of the rubber strip 15.

Next, as shown in FIG. 4(b), there is carried out a stage of forming the first cap portion 10A radially outward of the base portion 9 on the one tread edge e1 side. In this stage, a winding-start end 15Bs of the rubber strip 15B showing a non-conductivity based on a silica-rich compounding is fixed to an approximately middle position between an axially outer end 10Ao and an axially inner end 10Ai of the first cap portion 10A on the base portion 9.

Next, the rubber strip 15B is spirally wound toward axially outward of the tire, and then, the winding direction of the rubber strip 15B is turned at the outer end 10Ao and wound toward axially inward of the tire.

The rubber strip 15B is wound axially inwardly beyond the winding-start end 15Bs, the winding direction of the rubber strip 15B is again turned toward the axially outside at the inner end 10Ai of the first cap portion 10A and the winding is further continued. A winding-finish end 15Be of the rubber strip 15B is fixed at an approximately middle position between the outer end 10Ao and the inner end 10Ai. The rubber strip 15B is continuous between them.

Since the winding-start end 15Bs and the winding-finish end 15Be of the rubber strip 15B do not appear at the both ends of the first cap portion 10A, it is possible to prevent the first cap portion 10A from becoming a starting point of peeling off or the like. The winding mode of the rubber strip 15B is not limited to the above, and it is needless to say that the winding mode can be changed in various ways.

Next, as shown in FIG. 5(a), a stage for forming the conductive portion 11 is carried out by spirally winding a rubber strip 15C made of a conductive rubber around the base portion 9 and a tapered outer surface Ta of the first cap portion 10. This stage is carried out, for example, in such a manner that a winding-start end 15Cs of the rubber strip 15C is fixed onto the outermost side of the tapered outer surface Ta of the first cap portion 10A, the rubber strip 15C is spirally wound toward the other tread edge e2 side, and a winding-finish end 15Ce is fixed onto the forming former F at a position outward of the base portion 9. When the rubber strip 15C is wound, the side edges of the rubber strips 15C are preferably overlapped each other without forming gaps as in the present embodiment.

Thereafter, there is carried out a stage of forming the second cap portion 10B on the radially outside of the conductive portion 11. In this stage, firstly, a winding-start end 15Ds of a rubber strip 15D which shows a non-conductive property based on silica-rich compounding (needless to say, the composition of the rubber strip 15D may be the same as that of the rubber strip 15B for the first cap portion 10A), is fixed onto the base portion 9 at an approximately middle between an outer end 10Bo and an inner end 10Bi of the second cap portion 10B. Next, the rubber strip 15B is spirally wound toward the axially outward, is turned at an outer end 10Bo and is wound toward the axially inward beyond the winding-start end 15Ds. The winding direction is again turned to the axially outward at the axially inner end 10Bi, and the winding operation is completed. A winding-finish end 15De of the rubber strip 15D is fixed to an approximately middle position between the outer end 10Bo and the inner end 10Bi.

The tread rubber 2G integrally formed with the tread reinforcing cord layer 7 is formed by such a tread rubber forming step. Next, according to a conventional manner, the tread rubber 2G is mounted on a tread region of the carcass 6 while the carcass 6 is being shaped into a toroidal form, to give a raw tire, and it is then vulcanized to give the pneumatic tire 1.

Figure 6:
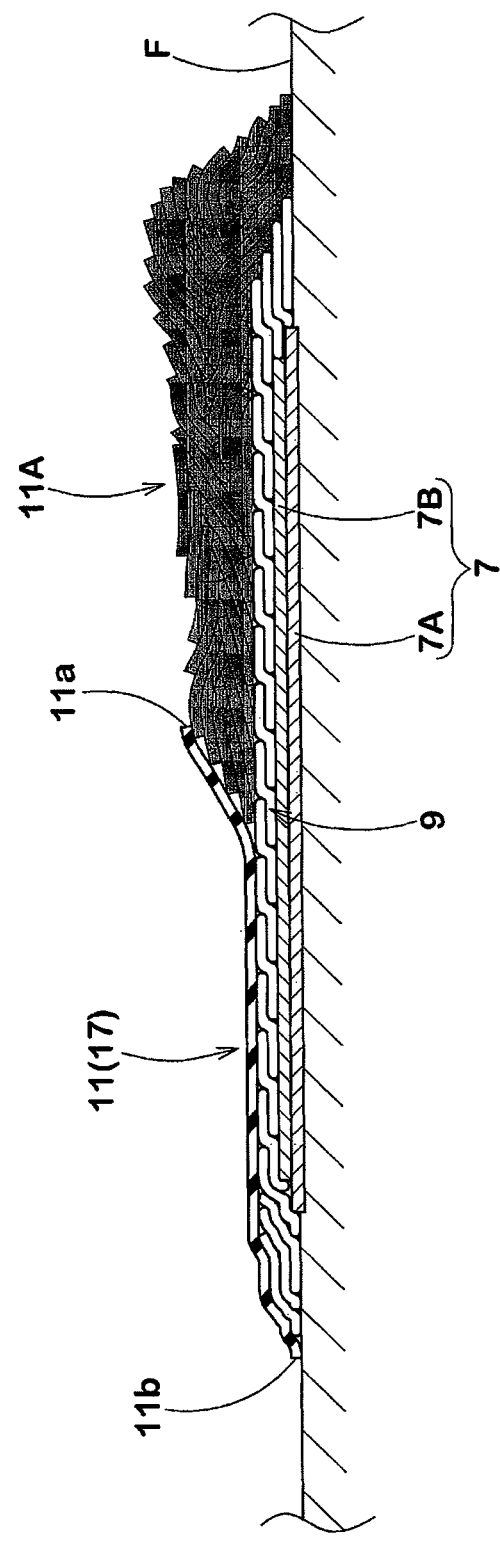
FIG. 6 is a sectional view for illustrating another embodiment of a step of forming a conductive portion.

FIG. 6 shows another embodiment of the first invention. In this embodiment, the conductive portion 11 is formed in such a manner that a rubber sheet 17 with a width continuously extending from the outer end 11b to the inner end 11a is wound at least one circuit, and both ends thereof in the circumferential direction are spliced. Next, a second cap portion (not shown) is disposed on the rubber sheet 17.

Figure 7:
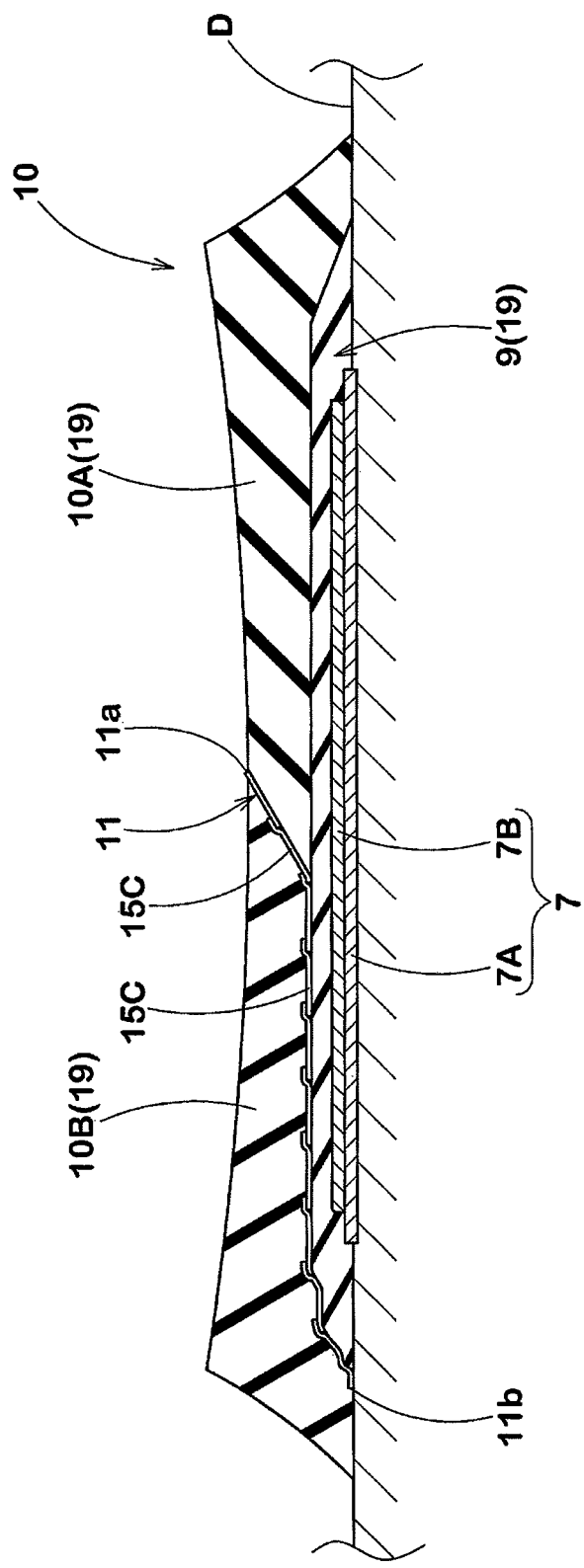
FIG. 7 is a sectional view for illustrating another embodiment of a tread rubber forming step.

FIG. 7 shows still another embodiment of the first invention.

In this embodiment, the base portion 9 and the cap portion 10 are formed by splicing an extruded rubber 19 which has been extruded by a rubber extrusion machine.

In this embodiment, the extruded rubbers 19 for the base portion 9 and the first cap portion 10A are wound outside of the tread reinforcing cord layer 7, respectively, and a ribbon-like rubber strip 15C made of a conductive rubber is spirally wound outside of them to form the conductive portion 11.

Next, the extruded rubber 19 for constituting the second cap portion 10B is wound around the outside of the conductive portion 11 and spliced. In this embodiment, too, the base portion 9 is formed without being divided into right and left and, therefore, deterioration of uniformity can be suppressed.

FIGS. 8 to 13 illustrate another embodiment of the second invention.

Figure 8:
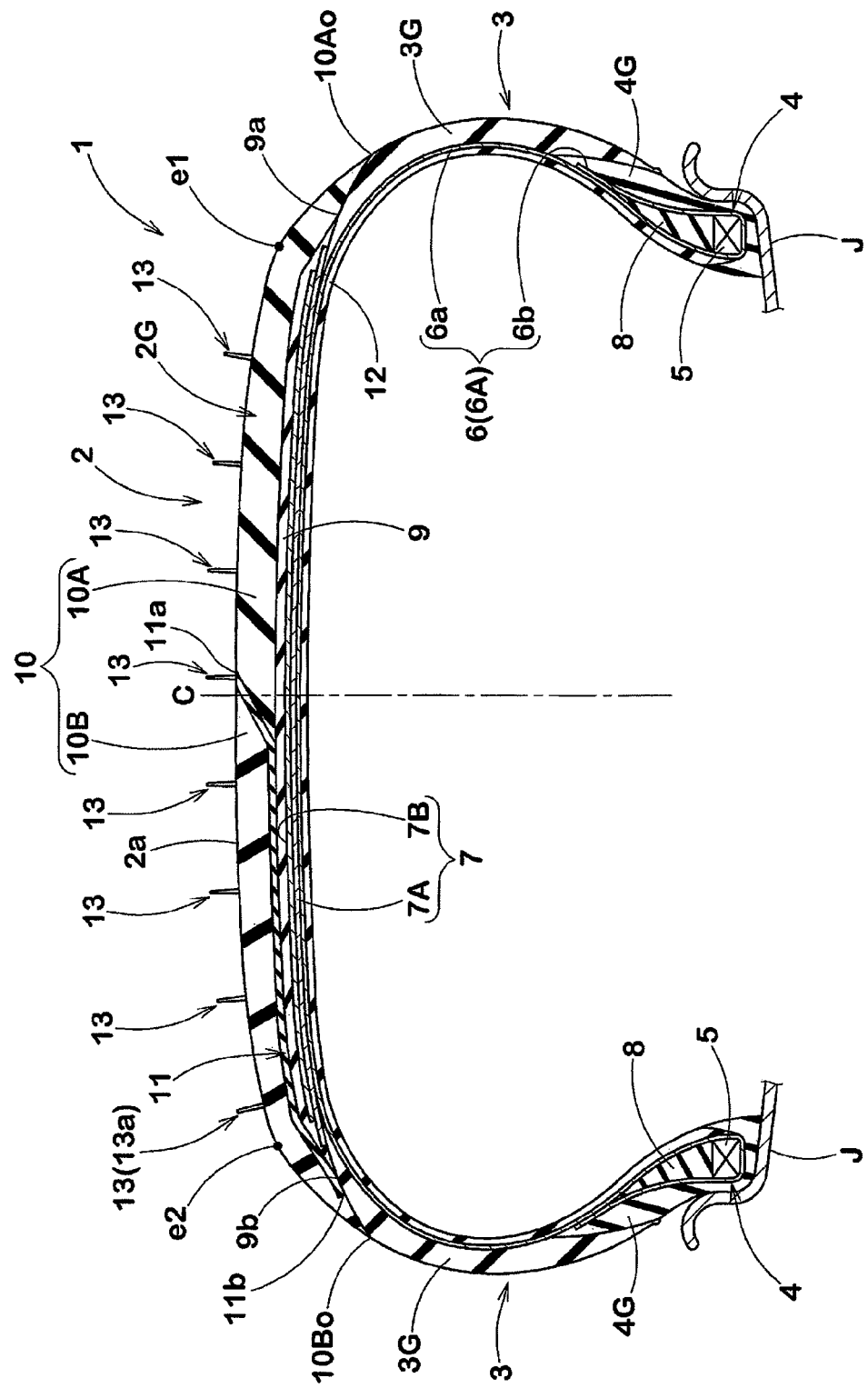
FIG. 8 is a sectional view of a pneumatic tire according to another embodiment of the first invention.
Figure 9:
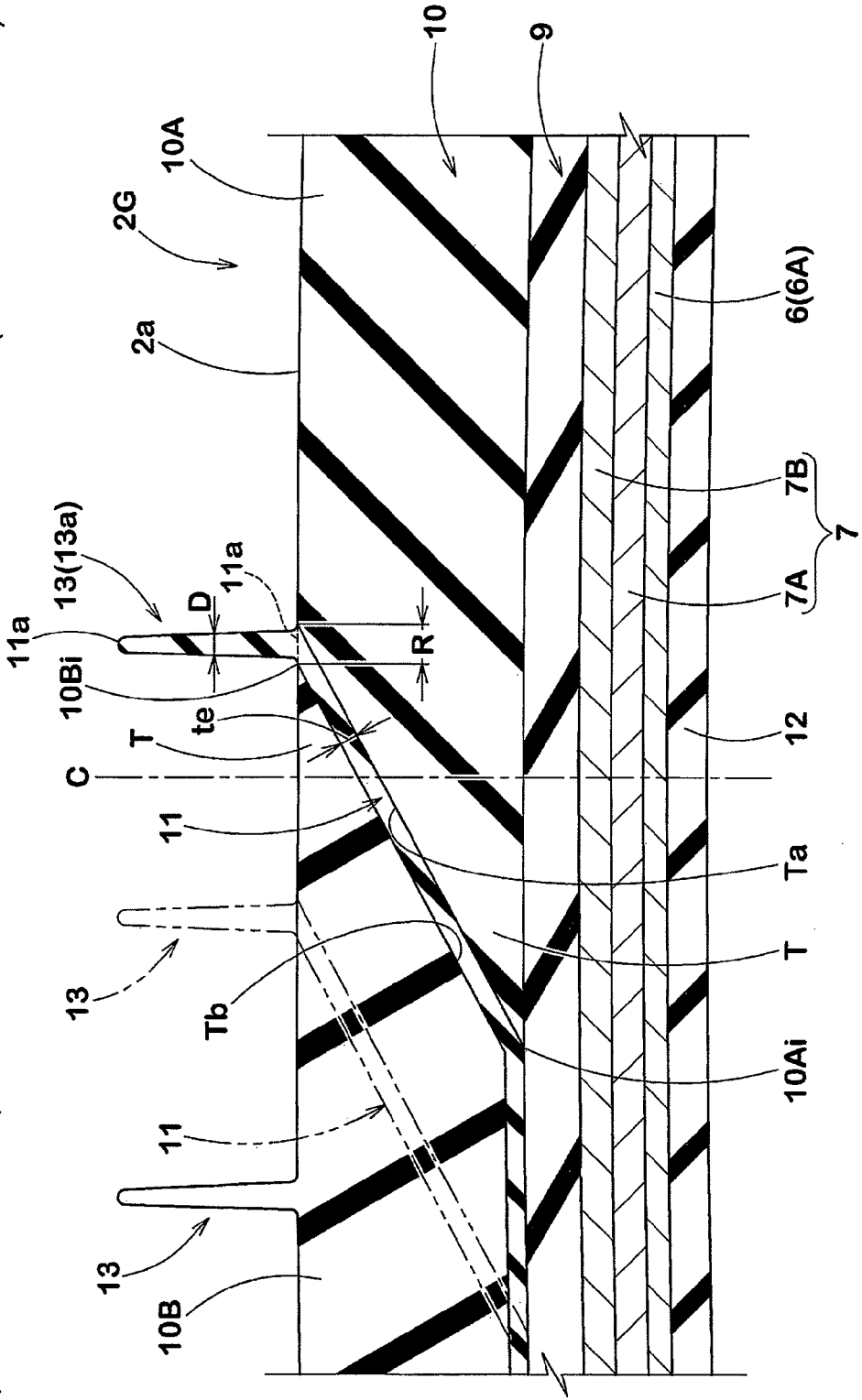
FIG. 9 is a partially enlarged view of a tread portion shown in FIG. 8.
Figure 10:
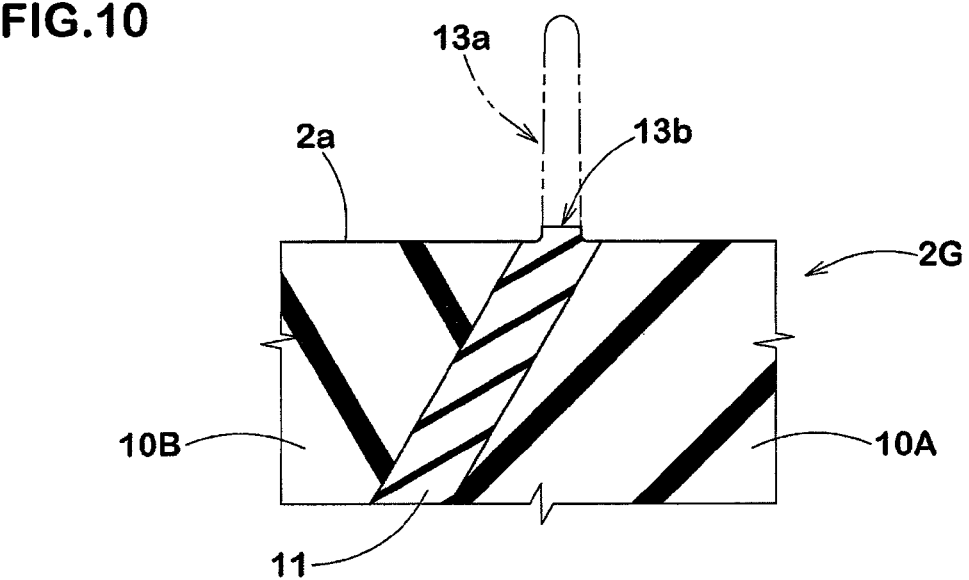
FIG. 10 is a partially enlarged view of the tread portion for illustrating a spew resection mark.
Figure 11A:
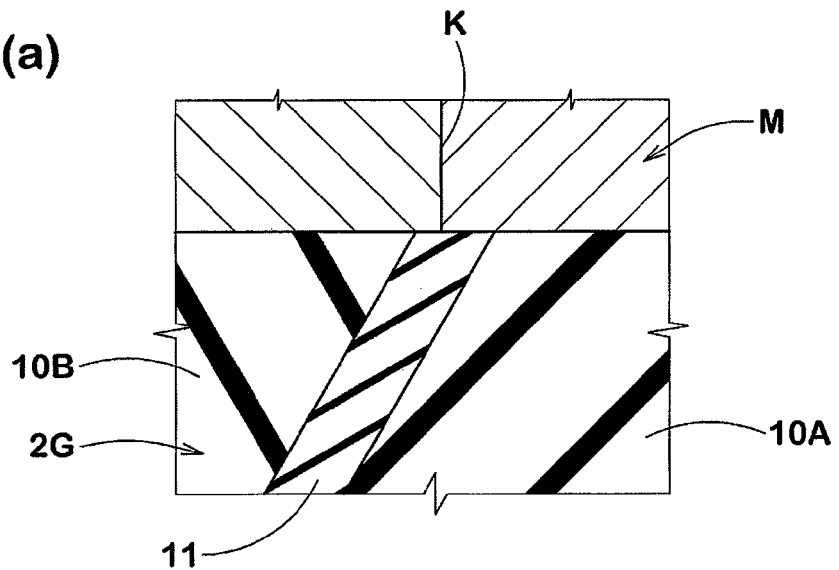
FIGS. 11(a) and 11(b) are partially enlarged views of the tread portion for illustrating a burr.
Figure 11B:
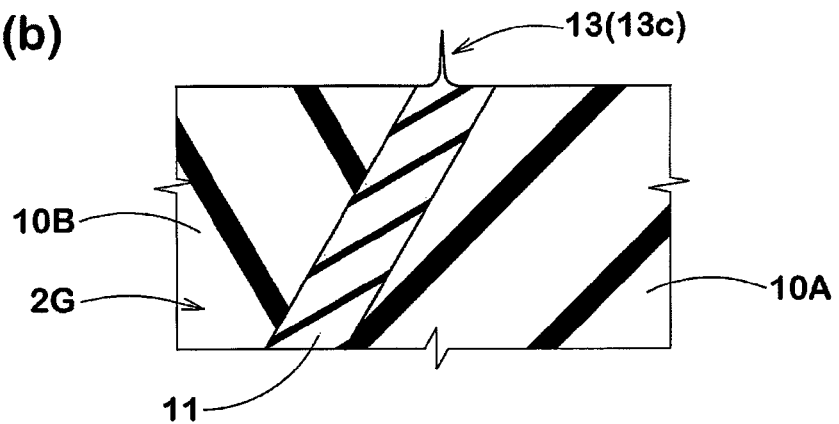

In the pneumatic tire 1 of this embodiment, the conductive portion 11 constitutes at least a part of protrusions 13 including any of a spew 13a as shown in FIGS. 8 and 9, a spew resection mark 13b as shown in FIG. 10 obtained by resecting the spew 13a, and a burr 13c as shown in FIG. 11(b).

Figure 12A:
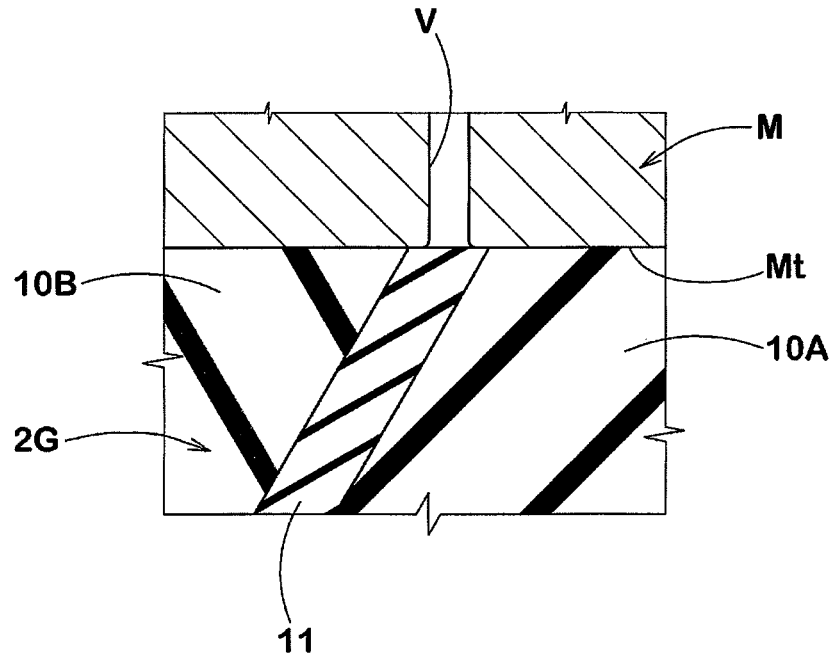
FIGS. 12(a) and 12(b) are sectional views for illustrating formation of a spew.
Figure 12B:
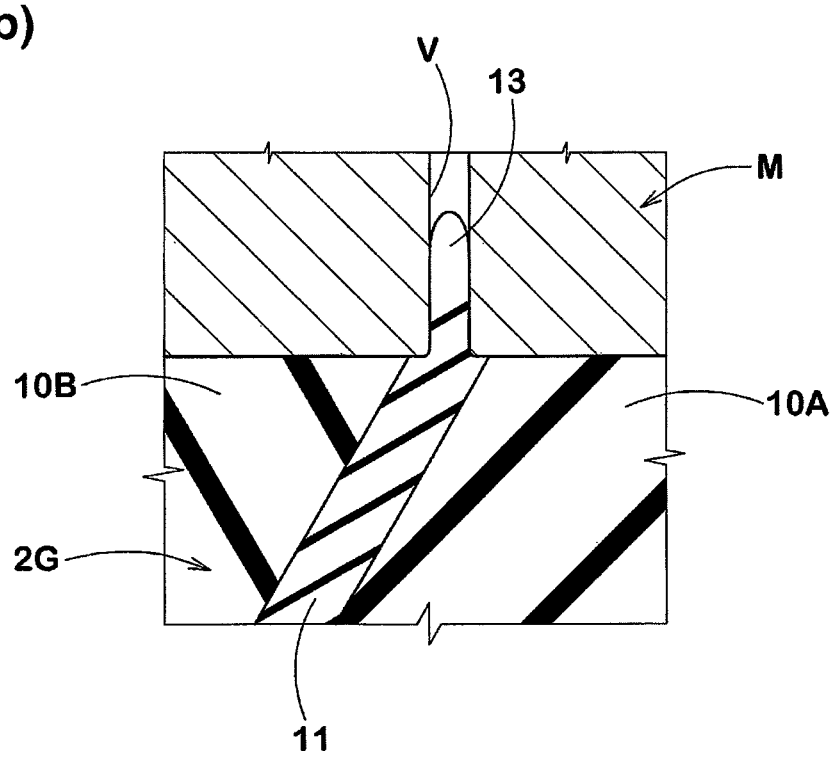

As partially shown in FIG. 12(a), a mold M for forming the pneumatic tire 1 of this embodiment is provided with a plurality of vent holes V that are small holes to release air remaining between the tread rubber 2G and a tread forming surface Mt of the mold M. The vent holes V are usually connected to a vacuum pump. When the tire is vulcanized and formed, it is pressed against the vent holes V by a pressure from a bladder (not shown). Therefore, as shown in FIG. 12(b), when the tire is vulcanized and formed, a part of the plasticized tread rubber 2G enters the vent holes V and is hardened therein. This remains on the surface of the vulcanized tread rubber 2G as the spews 13a. The spews 13a are provided at locations other than tread grooves provided in the tread rubber 2G.

The conductive portion 11 constitutes at least a part of the spews 13a, whereby even if the conductive portion 11 has, for example, a small axial width R (shown in FIG. 9), the conductive portion 11 is reliably exposed on the ground-contact surface 2a without being covered with a rubber of the cap portion 10 and conduction failure can be reduced even in mass production.

A part of the spews 13a are resected in a trimming step for a reason of design in some cases. In such a case, too, a spew resection mark 13b slightly projects radially outwardly from the ground-contact surface 2a (a portion formed by the tread forming surface Mt of the mold M), as shown in FIG. 10. Thus, even the spew resection mark 13b can bring the conductive portion 11 into contact with a road surface more reliably.

As shown in FIG. 11(b), the mold M is usually constituted by a plurality of pieces, and a thin gap is formed between divided surfaces K of the respective pieces. A part of the tread rubber 2G also enters the gap between the divided surfaces K and hardens therein to form a burr 13c as shown in FIG. 11(b). Therefore, the same effect as that of the spew 13a can be exhibited also when the conductive portion 11 forms a part of burrs 13c.

The most preferable protrusion 13 is the spew 13a. However, if an outer diameter D of the spew 13a is excessively small, the effect of sucking up a conductive rubber tends to become insufficient, and if the outer diameter D is excessively large, the appearance of the tire is remarkably impaired. From such points of view, the outer diameter D of the spew 13a is preferably not less than 0.6 mm, more preferably not less than 0.8 mm, and is preferably not more than 2.0 mm, more preferably not more than 1.5 mm.

Figure 13A:
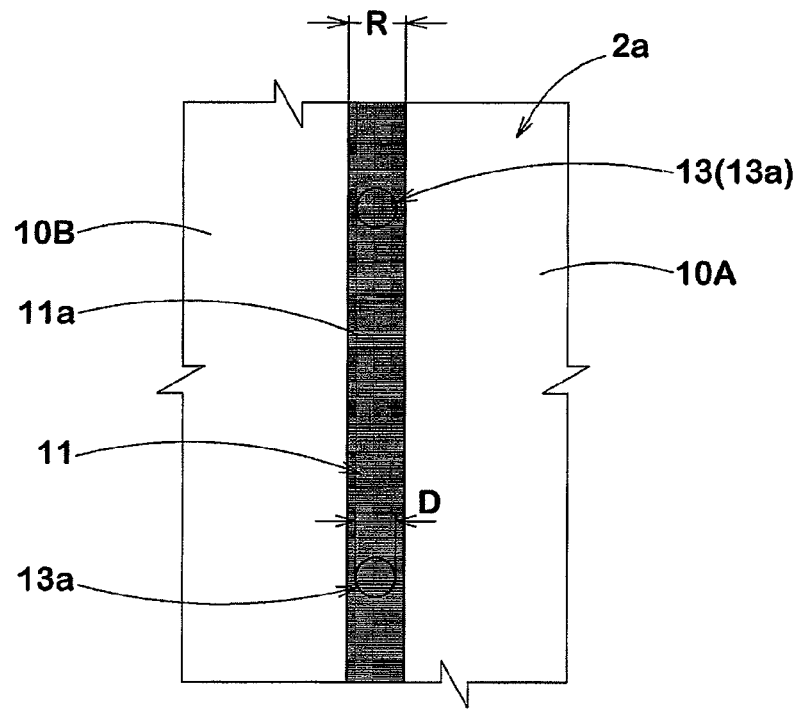
FIGS. 13(a) and 13(b) are partial plan views of the tread portion.
Figure 13B:
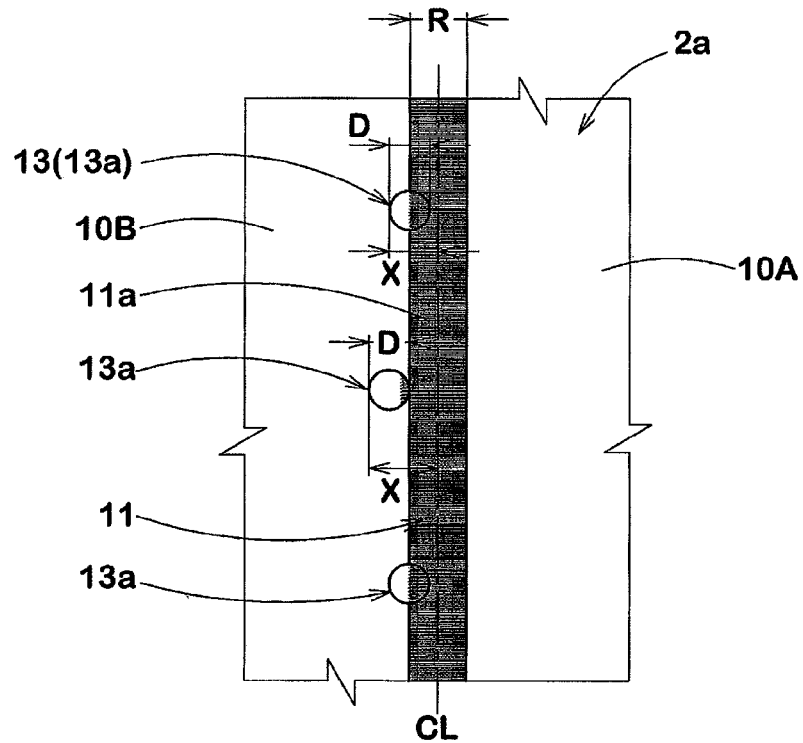

As shown in FIGS. 9 and 13(a), it is preferred for the spew 13a as a protrusion 13 that the entire spew is constituted by the conductive portion 11. However, only a part of the spew 13a may be constituted by the conductive portion 11, as shown in FIG. 13(b). In the latter case, in order to more reliably exhibit the discharge effect based on the spew 13a, it is preferable to dispose the spews so as to satisfy the following equation (1), especially the following equation (2):

$$x \le |R/2 + D| \quad (1)$$

$$x < |R/2 + D| \quad (2)$$

wherein "x" is an axial distance from a center line CL of the conductive portion 11 to the outermost position of the spew 13a, "R" is an axial width of the conductive portion 11, and "D" is a maximum outer diameter of the spew 13a. In case of disposing the spews 13a out of the center of the conductive portion 11, since the conductive portion 11 is inclined inside the tire in this embodiment, it is preferable that the spews 13a are disposed off-center on the inclination side (the left side in the drawing), whereby a larger amount of the conductive rubber can be sucked up.

In case that the protrusion 13 at least a part of which is formed of the conductive portion 11 is the spew 13a or the spew resection mark 13b, it is preferable that at least two protrusions 13, especially at least three protrusions 13, are always present in the ground contacting region when a tire in the normal condition is loaded with a normal load and is rotated on a flat surface at a camber angle of 0°. With this, static electricity can be discharged to a road more reliably.

In order to constitute a part of the protrusion 13 by the conductive portion 11, as shown in FIGS. 11(a) and 12(a), a part of the conductive portion 11 may be positioned and vulcanized such that at least a part of the conductive portion 11 appearing on the ground-contact surface 2a faces the divided surfaces K or the vent holes V of the mold M. This positioning can easily be carried out by determining the position of the conductive portion 11 in a raw tire based on the known position of the divided surface K or the vent holes V of the mold M.

[Second Invention]

Next, an embodiment of a pneumatic tire according to the second invention will be explained.

Figure 14:
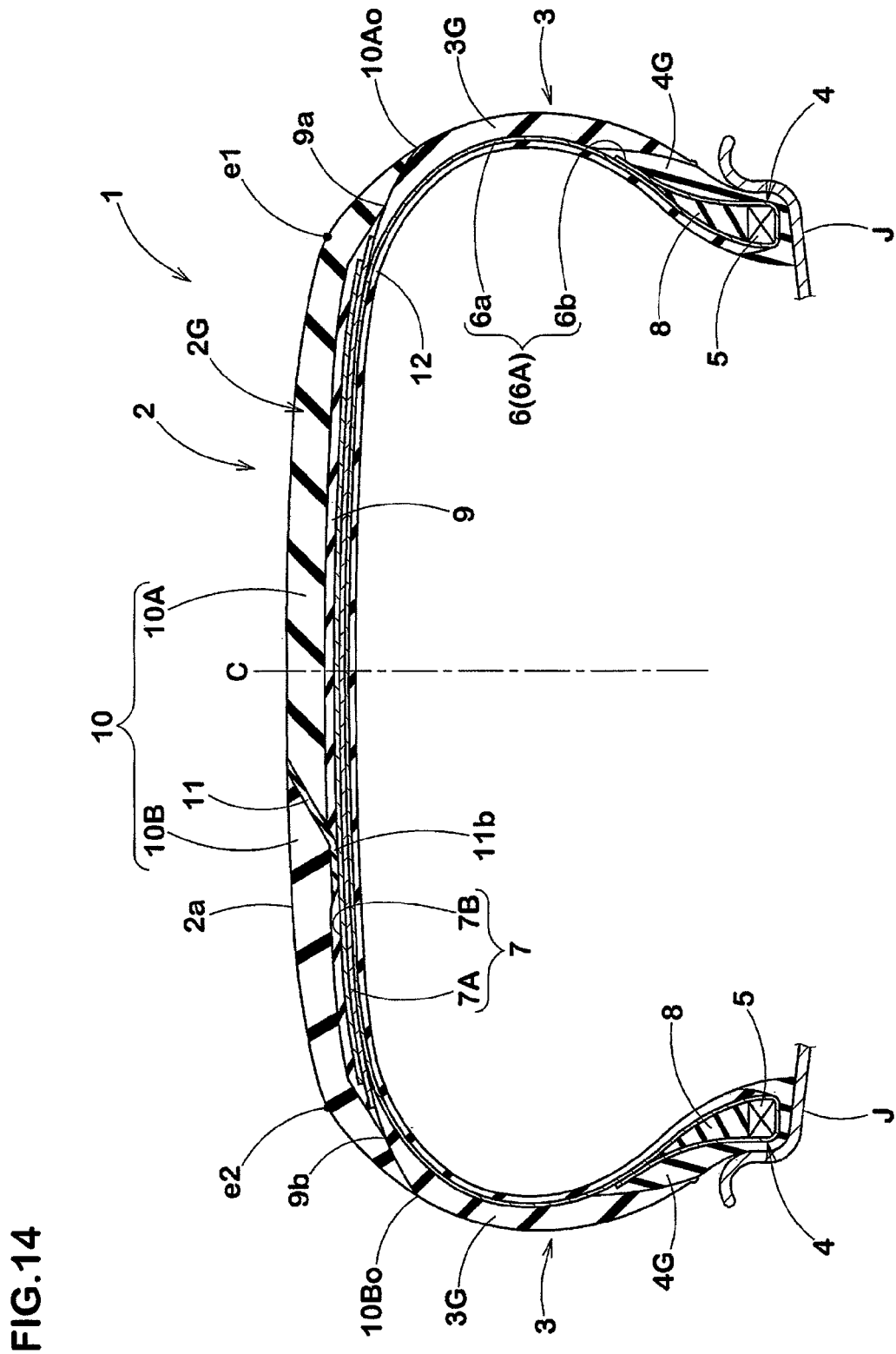
FIG. 14 is a sectional view of a pneumatic tire according to an embodiment of the second invention.
Figure 15:
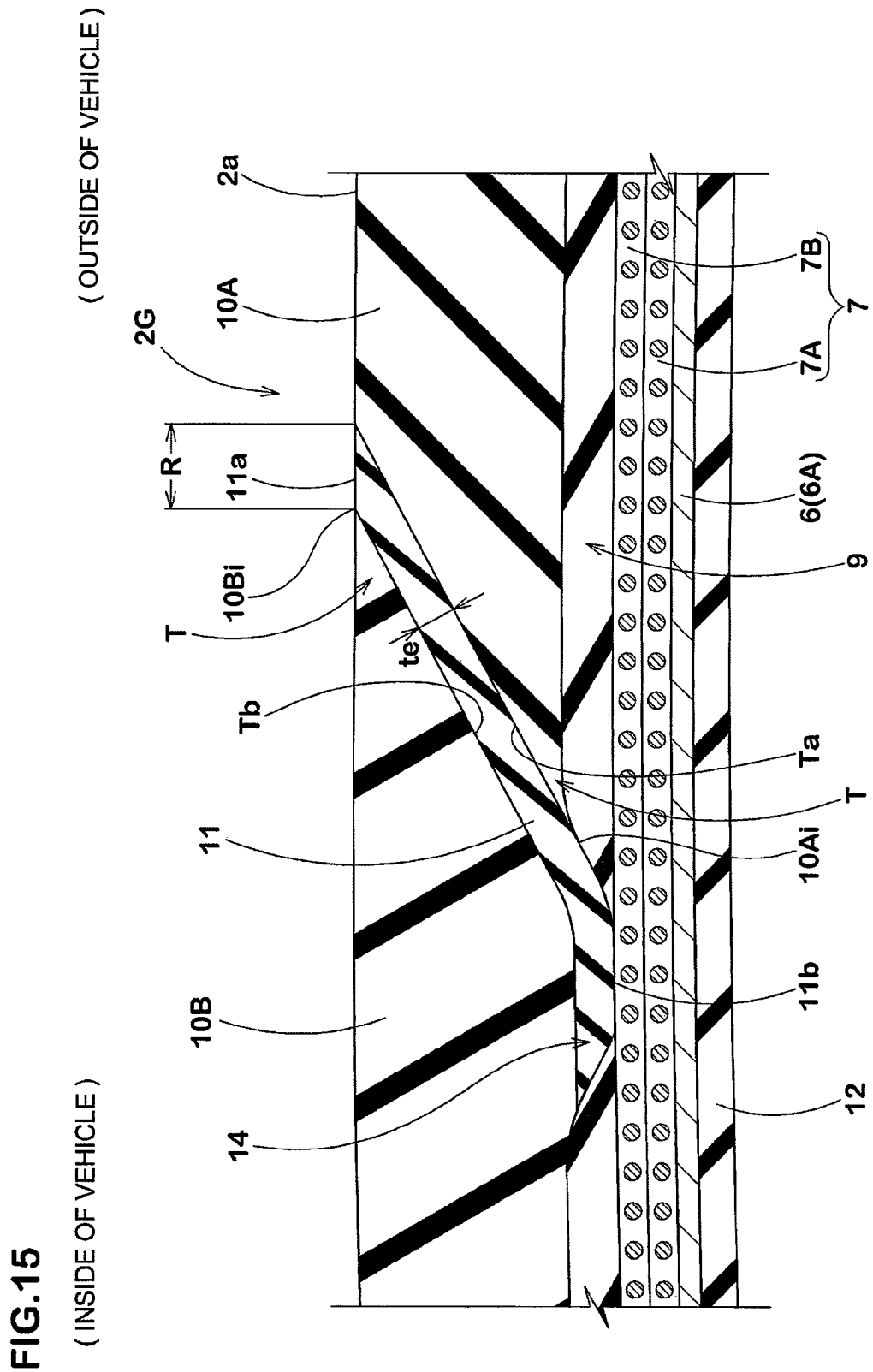
FIG. 15 is a partially enlarged view of a tread portion shown in FIG. 14.

FIG. 14 is a sectional view of a pneumatic tire 1 according to the second invention. FIG. 15 is an enlarged view of a main portion of the pneumatic tire. The pneumatic tire 1 also includes a toroidal carcass 6 extending from a tread portion 2 to bead cores 5 in bead portions 4 through sidewall portions 3, and a tread reinforcing cord layer 7 disposed radially outward of the carcass 6 in the tread portion 2. This structure is the same as that of the embodiment of the first invention.

Not only the carcass 6 and the tread reinforcing cord layer 7, but also sidewall rubber 3G, clinch rubber 4G and inner linear rubber 12 have the same structure and same rubber compositions as those of the previous embodiment.

The tread rubber 2G in this embodiment includes a base portion 9 made of a non-conductive rubber containing silica which is disposed on a radially inner side, a cap portion 10 made of a non-conductive rubber containing silica which is disposed radially outward of the base portion 9 to form a ground-contact surface 2a, and a conductive portion 11 made of a conductive rubber having one end exposed on the ground-contacting surface 2a and the other end connected to the tread reinforcing cord layer 7 to form an electrical conductive path to a rim J when the tire is mounted on the rim.

The base portion 9 is disposed on the tread reinforcing cord layer 7 in contact with the outer side thereof. It is formed by spirally winding a ribbon-like rubber strip 15 as shown in FIG. 3 from one tread edge e1 to the other tread edge e2.

The base portion 9 in this embodiment also has an axial width greater than that of the tread reinforcing cord layer 7. Therefore, axial outer ends 9a and 9b of the base portion 9 both are located axially outward of the ends of the tread reinforcing cord layer 7. Each of the axial outer ends 9a and 9b of the base portion 9 is connected, for example, to the sidewall rubber 3G.

The base portion 9 has a gap portion 14 from which the tread reinforcing cord layer 7 is exposed and which is formed by separating side edges 15e, 15e of adjacent rubber strips 15 from each other during winding operation of the rubber strip 15.

Figure 16:
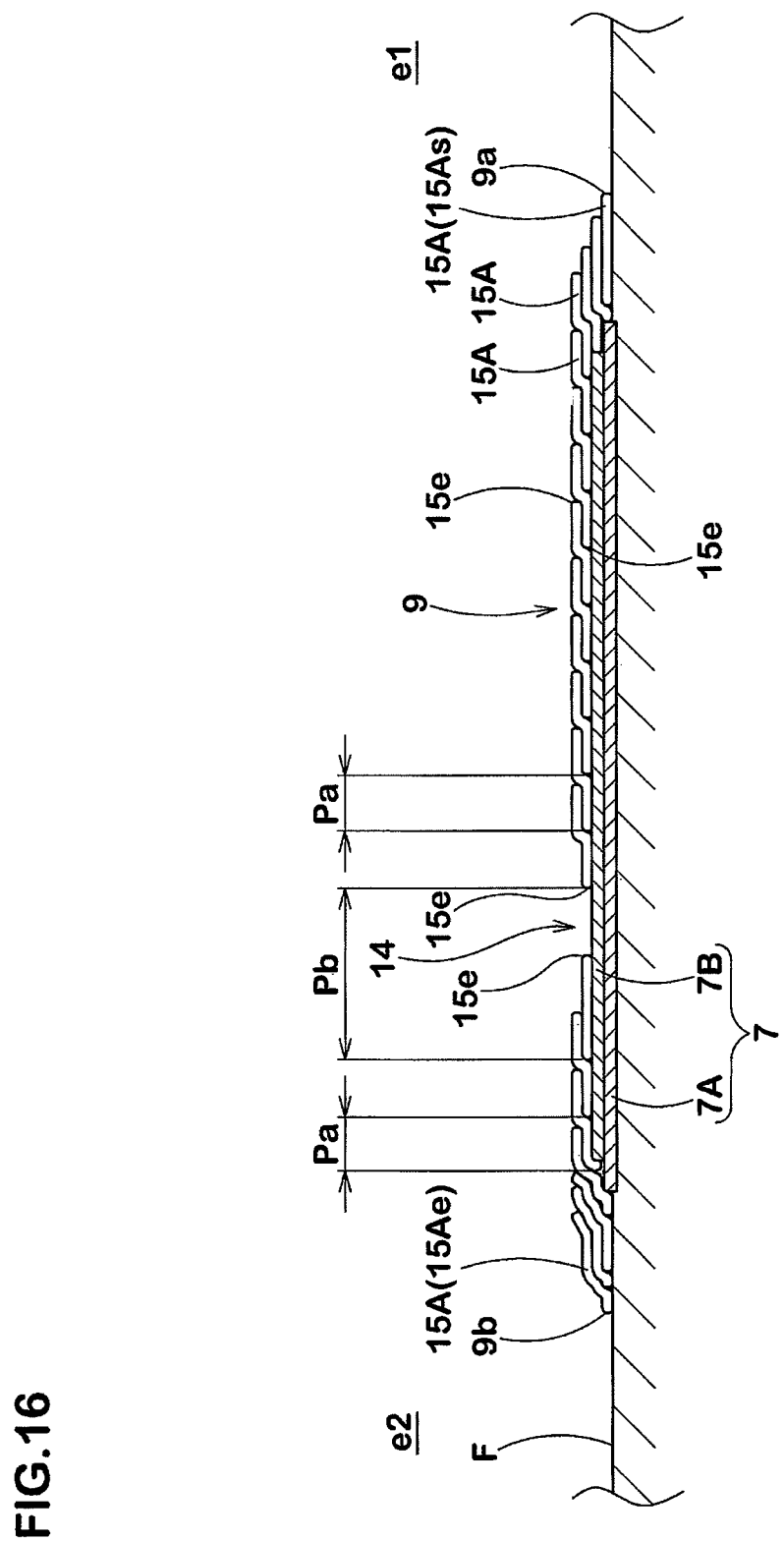
FIG. 16 is a sectional view for illustrating a step of forming a base portion.
Figure 17:
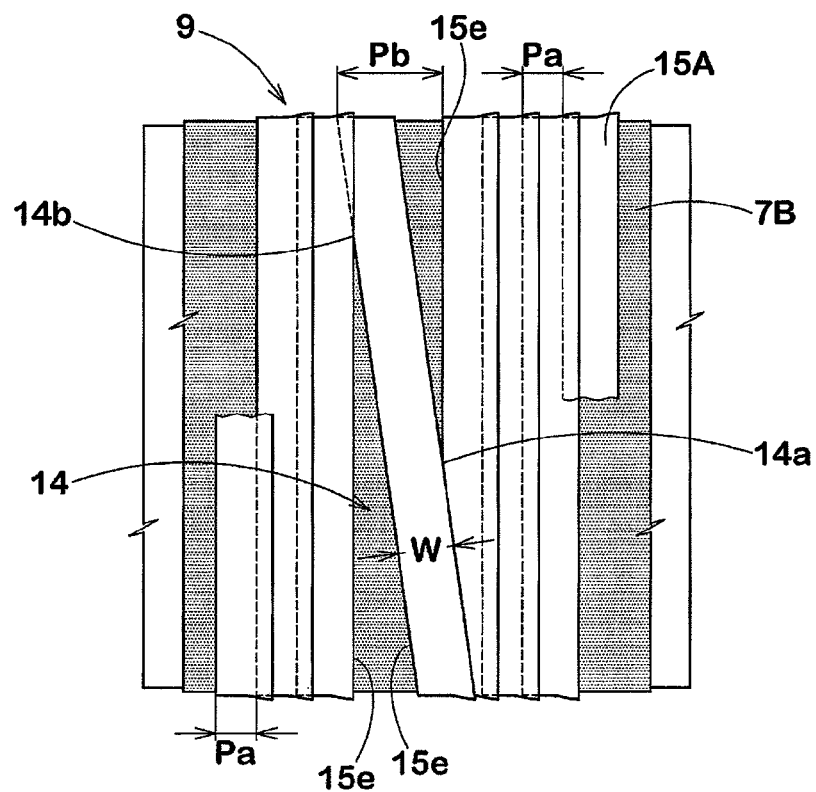
FIG. 17 is a plan view of the base portion for illustrating a gap portion.

FIGS. 16 and 17 show a step for forming such a base portion 9. The base portion 9 is formed by spirally winding a non-conductive rubber strip 15A containing silica in rich around a cylindrical forming former F on which the tread reinforcing cord layer 7 has been previously wound.

More specifically, firstly, a winding-start end 15As of the rubber strip 15A is fixed onto the forming former on an axially outer side of the tread reinforcing cord layer 7 on the one tread edge e1 side. Then, while the forming former F is rotated, the rubber strip 15 is moved toward the other tread edge e2 side at a predetermined speed, whereby the rubber strip 15A is spirally wound around the forming former F.

For some time after the winding operation is started, the rubber strip 15A are wound while side edges 15e thereof are overlapped each other so as not to form a gap. That is, the rubber strip 15A is wound in a predetermined section at a winding pitch Pa which is smaller than a width W of the rubber strip 15A.

Next, as shown in FIGS. 16 and 17, the side edges 15e and 15e of the adjacent rubber strips 15 are separated from each other during the winding operation so that the gap portion 14 is formed. The gap portion 14 shown in FIG. 17 is formed by winding the rubber strip 15A at a winding pitch Pb greater than the width W of the rubber strip 15A. The gap portion 14 in this embodiment spirally extends from a start point 14a to an end point 14b in the circumferential direction of the tire to have a circumferential length corresponding to approximately one circuit.

After the gap portion 14 is formed, the rubber strip 15A is wound again up to a winding-completion end 15Ae at a winding pitch Pa smaller than the width W of the rubber strip 15A without forming a gap. The winding-completion end 15Ae of the rubber strip 15A is fixed onto the forming former F at a position located axially outward of the tread reinforcing cord layer 7. The thickness of each portion of the base portion 9 can freely be set by adjusting the winding pitch of the rubber strip 15.

As is apparent from FIG. 17, the base portion 9 formed in this manner can form the gap portion 14 having a length of approximately one circuit of the tire in the circumferential direction without being completely divided into right and left. That is, the base portion 9 can expose the conductive tread reinforcing cord layer 7 over a sufficient length of approximately one circuit in the circumferential direction of the tire.

However, if the width and length of the gap portion 14 are increased, a volume of the base portion 9 made of a silica rich rubber compound is reduced, so there is a possibility that the rolling resistance is deteriorated. On the other hand, if the width and length of the gap portion 14 are excessively small, a conductive region cannot be obtained sufficiently. From such viewpoints, it is preferable that the pitch Pb of winding the rubber strip 15 in the gap portion 14 is greater than the width W of the rubber strip 15, especially not less than 1.2 times, more especially not less than 1.5 times, the width W, and is not more than 2 times the width W. The length of the gap portion 14 is preferably at least half circuit in the circumferential direction of the tire, and is preferably not more than 2 circuits, more preferably not more than 1.5 circuits.

Figure 18:
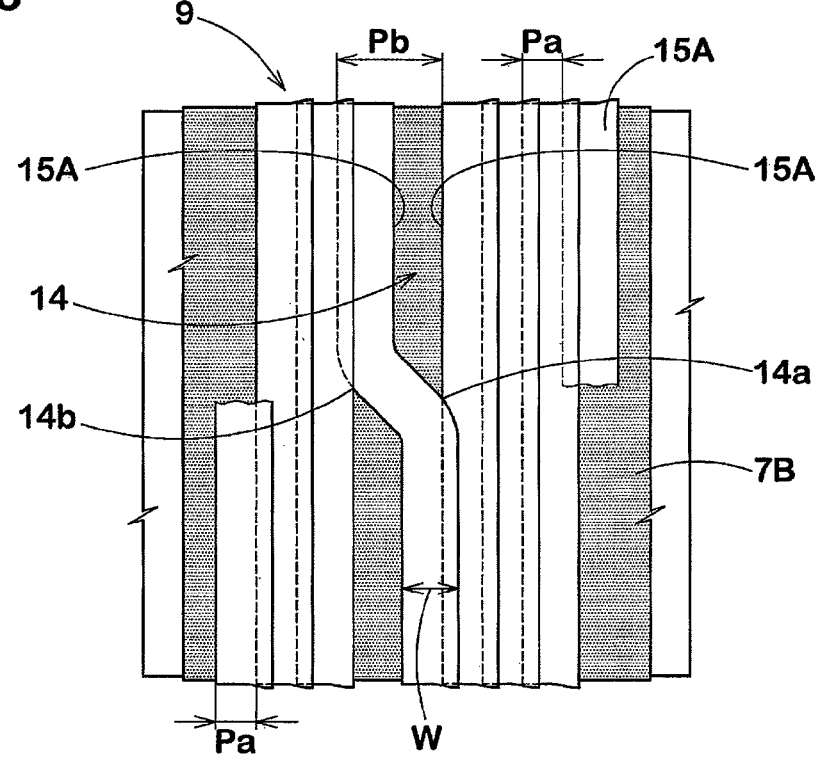
FIG. 18 is a plan view of a base portion for illustrating a gap portion according to another embodiment.

The gap portion 14 may be formed in such a manner that the rubber strip 15A is locally bent, as shown in FIG. 18.

In this embodiment, the cap portion 10 includes a first cap portion 10A and a second cap portion 10B divided into right and left parts at a location near the gap portion 14. In this embodiment, the first cap portion 10A is disposed on one tread edge e1 side (the right side in FIG. 14) with respect to the gap portion 14, and the second cap portion 10B is disposed on the other tread edge e2 side (the left side in FIG. 14) with respect to the gap portion 14.

Axially outer ends 10Ao and 10Bo of the cap portions 10A and 10B each is disposed axially outward of the tread edge e1 or e2, especially axially outward of the axially outer end 9a or 9b of the base portion 9. That is, the ground-contact surface 2a except the conductive portion 11 is formed by the first cap portion 10A and the second cap portion 10B.

Further, as shown in FIG. 15 in an enlarged scale, each of the cap portions 10A and 10B has a tapered portion T having a thickness gradually reducing toward an axially inner end 10Ai or 10Bi thereof in the same manner as the previous embodiment. That is, the first cap portion 10A has a tapered outer surface Ta on a radially outer side thereof, and the second cap portion 10B has a tapered inner surface Tb on a radially inner surface thereof, facing the tapered outer surface Ta.

Like the previous embodiment, a carbon rich rubber composition and a rubber composition containing a conductive powder (e.g., metal powder) instead of carbon or together with carbon are applicable to the conductive portion 11.

One end 11a of the conductive portion 11 located on a radially outer side thereof is exposed on the ground-contact surface 2a. In this embodiment, the one end 11a of the conductive portion 11 is exposed on the ground-contact surface 2a continuously in the circumferential direction of the tire. Therefore, the conductive portion 11 can come into contact continuously with a road during running. Further, since the conductive portion 11 in this embodiment is also provided near the tire equator C, the conductive portion 11 can come into contact with a road not only during straight running but also during cornering.

The conductive portion 11 extends radially inwardly from the one end 11a between the first cap portion 10A and the second cap portion 10B, i.e., between the tapered outer surface Ta and the tapered inner surface Tb. The other end 11b of the conductive portion 11 is connected to the tread reinforcing cord layer 7 (specifically, to a conductive topping rubber of a belt ply 7B) through the gap portion 14 of the base portion 9.

Therefore, when the pneumatic tire 1 in this embodiment is mounted on the rim J, the rim J and the conductive portion 11 are electrically conducted through the tread reinforcing cord layer 7, the sidewall rubber 3G and the clinch rubber 4G.

Therefore, according to the pneumatic tire 1 of this embodiment also, static electricity accumulated in a vehicle is discharged to a road through the rim J, the clinch rubber 4G, the sidewall rubber 3G, the tread reinforcing cord layer 7 and the conductive portion 11, so trouble such as radio noise is improved. Further, since the base portion 9 of the tread rubber 2G extends in the widthwise direction of the tread without being completely divided, it is possible to prevent the rolling resistance from being deteriorated. Also, forming accuracy for the tread rubber 2G is improved, so uniformity of the tire is improved.

For the purpose of sufficiently exhibiting such a conduction effect, it is preferable that the thickness "te" of the conductive portion 11 and the exposure width R of the conductive portion 11 exposed on the ground-contact surface 2a are set in the same ranges as those in the embodiment mentioned above.

In this embodiment, too, in the tire meridian cross section the conductive portion 11 extends radially inwardly from the one end 11a while tilting toward the vehicle inner side. Thus, since respective rubbers of the cap portion 10 having low rolling resistance and the base portion 9 exist on the radially inner side of the one end 11a, it is possible to prevent the rolling resistance from being deteriorated. When the tread rubber 2G is worn, the exposure position of the one end 11a of the conductive portion 11 exposed on the ground-contact surface 2a can be further shifted toward the vehicle inner side.

It is preferable that the cap portion 10 and the conductive portion 11 are also formed as strip laminated bodies in which the ribbon-like rubber strip 15 as shown in FIG. 3 is spirally wound, like the base portion 9.

Figure 19:
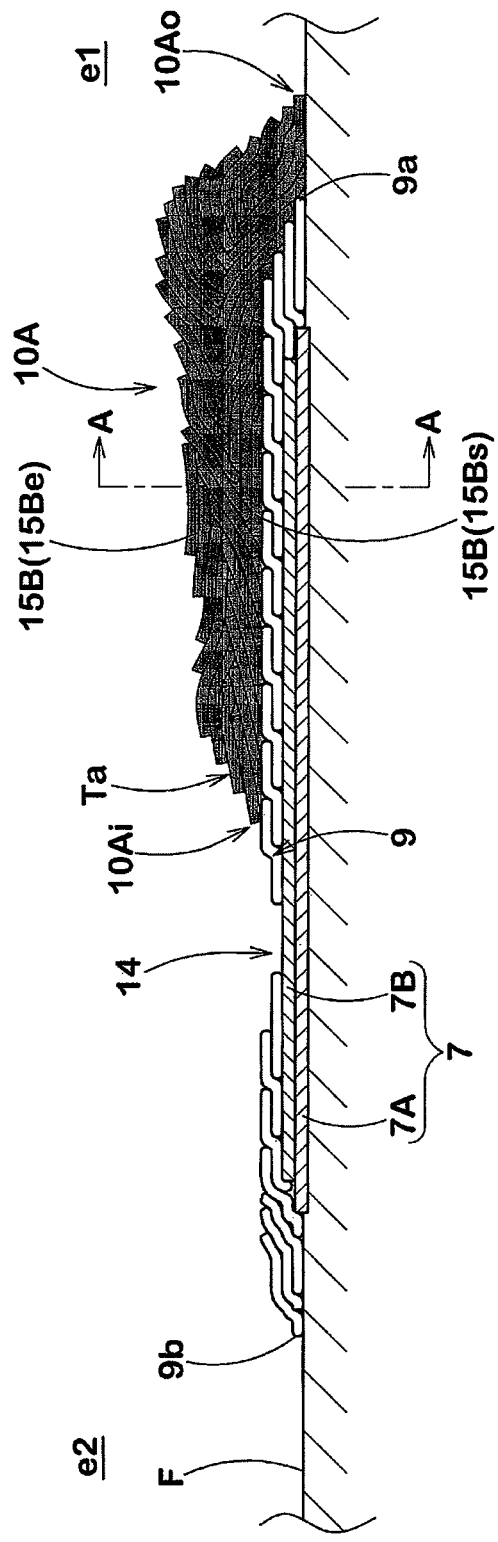
FIG. 19 is a sectional view for illustrating a step of forming a tread rubber according to the second invention.

Next, a method for manufacturing the pneumatic tire 1 of this embodiment will be described. As shown in FIG. 16, the tread reinforcing cord layer 7 and the base portion 9 are formed on the forming former F and then, a step for forming the first cap portion 10A is carried out. In this step, as shown in FIG. 19, a silica-rich rubber strip 15B is continuously wound on the base portion 9 in a region on the one tread edge e1 side, thereby forming an approximately trapezoidal first cap portion 10A. At that time, the first cap portion 10a is formed so that the gap portion 14 is not covered.

The winding-start end 15Bs of the rubber strip 15 is fixed onto an approximately middle position between the outer end 10Ao and the inner end 10Ai of the first cap portion 10A. Next, the rubber strip 15B is spirally wound toward the axially outer side, the winding direction is turned at the outer end 10Ao and the winding is continued toward the axially inner side. The winding direction is again turned to the axially outer side at the inner end 10Ai located at a position axially inward of the winding-start end 15Bs, and the winding operation is completed.

The winding-completion end 15Be of the rubber strip 15B is fixed, for example, at a nearly middle between the outer end 10Ao and the inner end 10Ai of the first cap portion 10A. During this winding operation, the rubber strip 15B is continuous without being cut. In such a first cap portion 10A, since the winding-start end 15Bs and the winding-finish end 15Be of the rubber strip 15B both do not appear on the both ends of the first cap portion 10A, it is avoided that the winding-start or winding-finish end becomes a start point of peeling off or the like. It is needless to say that the winding mode of the rubber strip 15B is not limited to such a mode and can be changed in various ways.

Next, a stage of forming the conductive portion 11 is carried out by, as shown in FIG. 20(a), spirally winding the rubber strip 15C made of a conductive rubber on the tapered outer surface Ta of the first cap portion 10A which is an axially inner end portion of the first cap portion 10A. In this stage, for example, the winding-start end 15Cs of the rubber strip 15C is fixed to the outermost end of the tapered outer surface Ta, the rubber strip 15C is spirally wound toward the other tread edge e2 side, and the rubber strip 15C is connected to the tread reinforcing cord layer 7 through the gap portion 14 of the base portion 9.

Preferably, the rubber strip 15C is connected to the tread reinforcing cord layer 7 in such a manner as covering the entire region of the gap portion 14, whereby the conductive portion 11 can be brought into contact with the tread reinforcing cord layer 7 with a length of one circuit in the circumferential direction of the tire and accordingly a reliable conduction passage can be formed. When the rubber strip 15C is wound, it is preferable to conduct the winding in such manner that side edges of the rubber strip 15C are overlapped each other as in this embodiment.

Thereafter, as shown in FIG. 20(b), there is carried out a stage of forming the second cap portion 10B made of a silica-rich non-conductive rubber in a region axially outward of the base portion 9 and in the other end side region between the conductive portion 11 and the other tread edge e2.

The winding-start end 15Ds of the rubber strip 15D is fixed, for example, to the base portion 9 at a nearly middle position between the outer end 10Bo and the inner end 10Bi thereof. The rubber strip 15D is spirally wound toward axially outward, the winding direction is turned to axially inward at the outer end 10Bo and the rubber strip 15B is wound axially inward so as to cover the conductive portion 11. The winding-completion end 15De of the rubber strip 15D is disposed near the one end 11a of the conductive portion 11.

The tread rubber 2G integrally formed with the tread reinforcing cord layer 7 is formed by the tread rubber forming step as mentioned above. In accordance with a conventional manner, the tread rubber 2G is attached to a tread region of the carcass 6 while the carcass 6 is shaped into a toroidal shape, to give a raw tire, and it is then vulcanized to produce a pneumatic tire 1.

Figure 21:
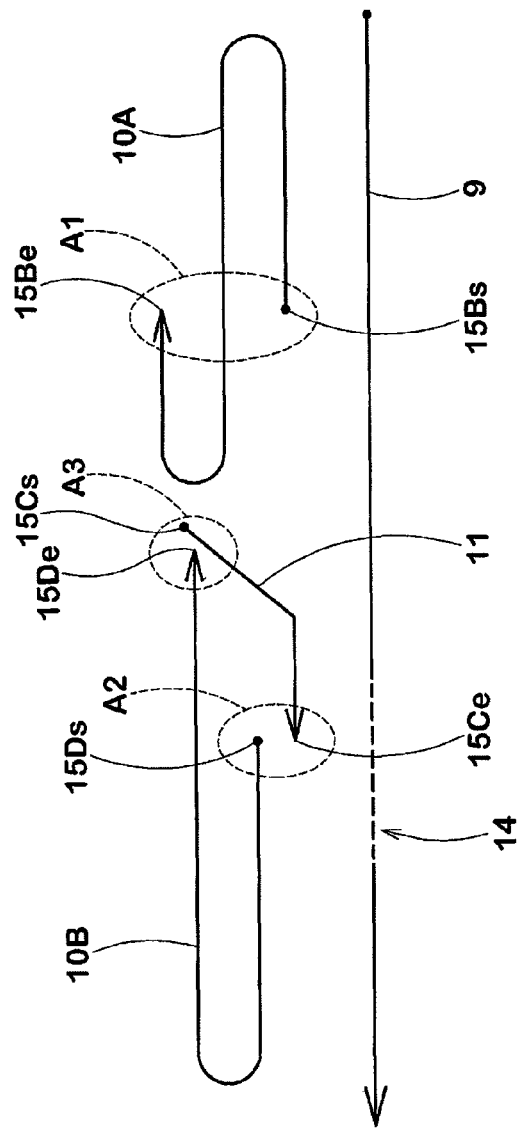
FIG. 21 is a schematic view for illustrating a winding direction of a rubber strip according to the second invention.

FIG. 21 shows schematically a winding direction of the rubber strip 15 in respective portions of the tread rubber 2G in this embodiment. For example, in the first cap portion 10A in this embodiment, the winding-start end 15Bs and the winding-completion end 15Be of the rubber strip are disposed substantially at the same position in the circumferential and axial directions of the tire.

Figure 22:
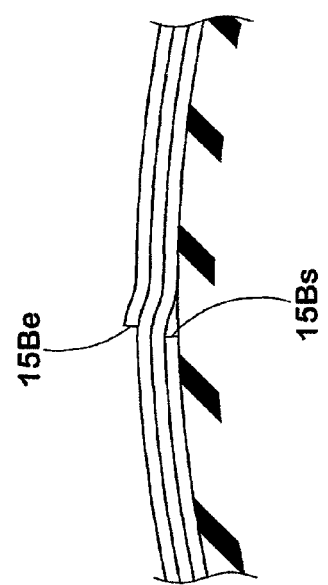
FIG. 22 is a sectional view taken along line A-A in FIG. 19.

FIG. 22 shows, as an example, a sectional view taken along the line A-A in FIG. 7. By disposing the winding-start end 15Bs and the winding-completion end 15Be of the rubber strip in such a manner as butt joint as shown in FIG. 22 when viewed above in the perspective state, weight balance of respective rubber portions is more uniformized in the circumferential direction of the tire, so the uniformity is enhanced.

Similarly, it is preferable that the winding-start end 15Cs of the conductive portion 11 and the winding-completion end 15De of the second cap portion 10B are disposed substantially at the same position in the circumferential and axial directions of the tire. It is also preferable that the winding-completion end 15Ce of the conductive portion 11 and the winding-start end 15Ds of the second cap portion 10B are disposed substantially at the same position in the circumferential and axial directions of the tire.

Figure 23:
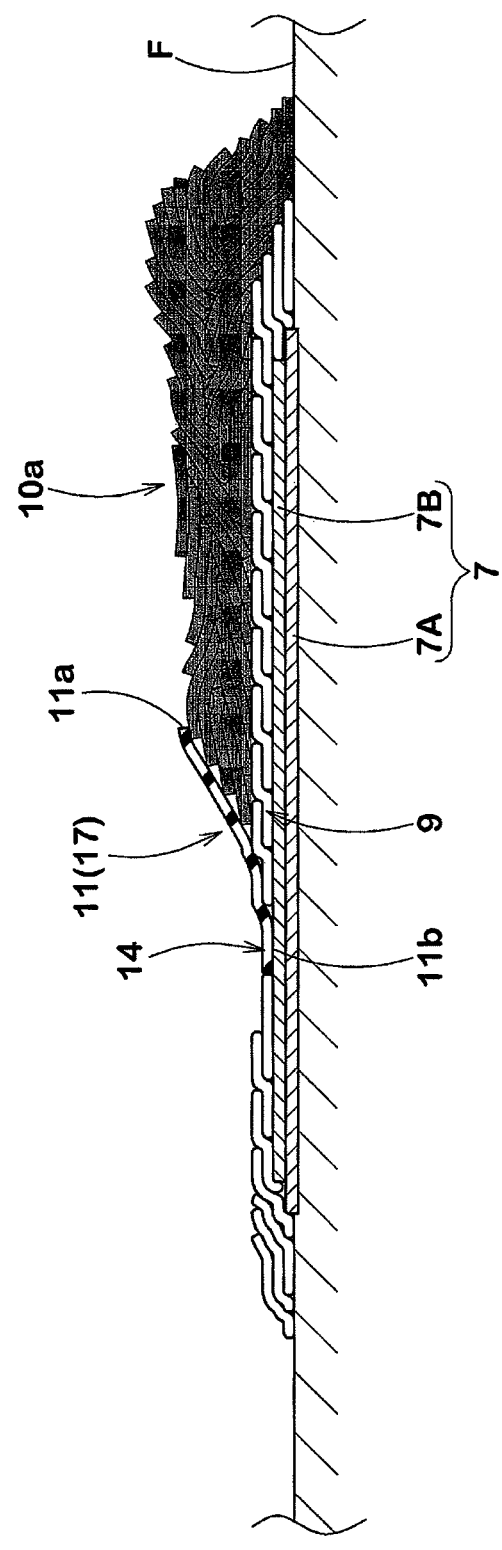
FIG. 23 is a sectional view for illustrating a step of forming a tread rubber according to another embodiment of the second invention.

FIG. 23 shows another embodiment of the second invention. In this embodiment, the conductive portion 11 is formed by non-spirally winding one sheet of a rubber sheet 17 with a width extending from the one end 11a to the other end 11b at least one circuit in the circumferential direction of the tire, and splicing circumferential both ends thereof.

Although now shown in the drawings, the cap portion 10 may be one formed by splicing an extruded rubber that has been extruded by a rubber extrusion machine, like the first invention. Further, in the second invention, too, the conductive portion 11 may be formed to constitute at least a part of a protrusion 13 such as a spew and a burr.

Although the pneumatic tires and the method for manufacturing the same according to the first and second inventions have been described in detail, it is needless to say that the present invention is not limited to these concrete embodiments, and the invention can be modified in various ways and carried out.

Examples

First Invention

Pneumatic tires (size: 215/45R17) having a base structure shown in Table 1 were manufactured, and electric resistance and uniformity of each tire were measured. In each Example, a silica-rich non-conductive rubber was used for the cap portion and the base portion, and a carbon-rich conductive rubber was used for the conductive portion (through-terminal portion). Formulations of these rubbers are common to all Examples. Everything is common to all tires, except parameters shown in Table 1.

Figure 25:
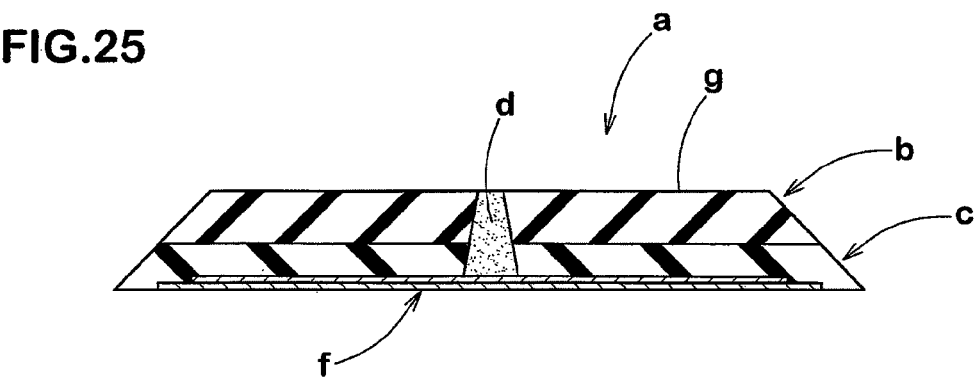
FIG. 25 is a sectional view of a conventional tread rubber.
Figure 26:
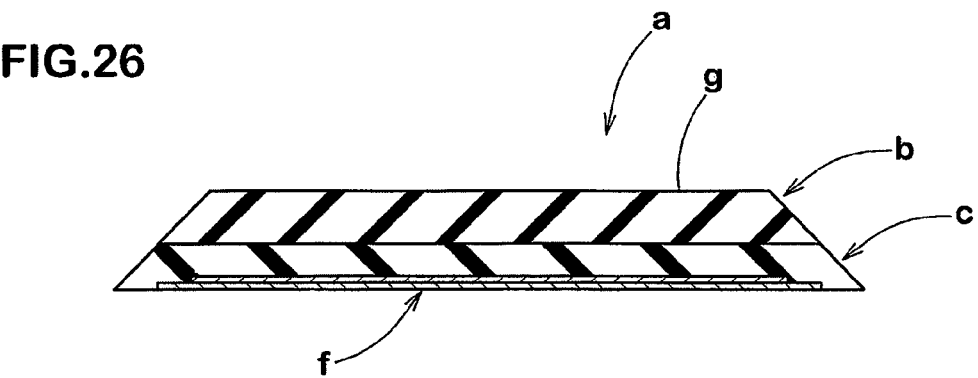
FIG. 26 is a sectional view of a tread rubber in Comparative Example 2.

In Comparative Example 2, a tread rubber having no through-terminal portion (d) was used, as shown in FIG. 26. Therefore, the cap portion and the base portion are not divided into two parts. Comparative Example 3 has a base structure shown in FIG. 25, but the cap portion and the base portion are formed of strip laminated bodies. The winding manner of the rubber strip is the same in both the Comparative Examples and the Examples. The test methods are as follows:

<Electric Resistance of Tires>

Figure 24:
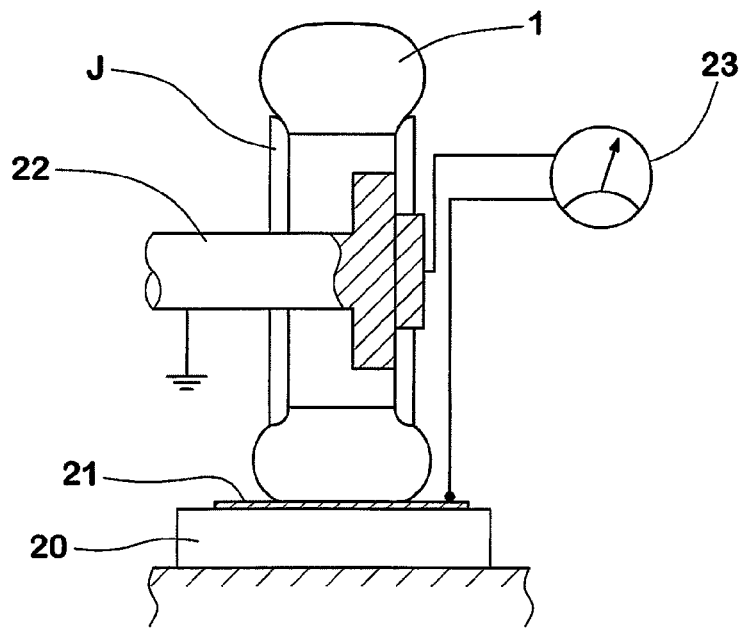
FIG. 24 is a schematic sectional view conceptually showing an electrical resistance measuring apparatus for a tire.

The electric resistance of a tire-rim assembly was measured according to a JATMA standard by using a measuring apparatus including, as shown in FIG. 24, a polished metal plate 31 (electric resistance: not more than $10\Omega$) mounted on an insulating plate 20 (electric resistance: not less than $10^{12}\Omega$), a conductive tire-mounting shaft 22 for holding the tire-rim assembly, and an electric resistance meter 23. Each test tire 1 was previously washed to sufficiently remove a releasing agent and a grime on the surface and was sufficiently dried. Other conditions are shown below.

Rim material: aluminum alloy
Rim size: 17×7J
Inner pressure: 200 kPa
Load: 5.3 kN
Test environment temperature (testing room temperature): 25° C.
Humidity: 50%
Measuring range of the electric resistance meter: $10^3$ to $1.6 \times 10^{16}\Omega$
Test voltage (applied voltage): 1,000 V
Test was made as follows:

(1) Test tire 1 was mounted on the rim to give a tire-rim assembly. At that time, an aqueous solution of a soap was applied as a lubricant to a contacting portion between them.
(2) After allowing to stand for 2 hours in the testing room, the tire-rim assembly was attached to the tire-mounting shaft 22.
(3) To the tire-rim assembly, the above-mentioned load was applied firstly for 0.5 minute, then released and applied again for 0.5 minute, released again and finally applied for 2 minutes.
(4) The test voltage was applied. After 5 minutes, the electric resistance between the tire-mounting shaft 22 and the metal plate 21 was measured by the electric resistance meter 23. The measurement was made at four positions spaced at 90 degrees in the tire circumferential direction, and the maximum value was adopted as the electric resistance (measured value) of the tire T.

<Uniformity of Tire>

With respect to each test tire, uniformity, radial force variation (RFV) which is a variation component of a force in the tire radial direction at the time of rotation, was measured under the following conditions according to uniformity testing conditions of JASO C607:2000. The results are shown by an index of the reciprocal of the measured RFV based on a result of Comparative Example 1 regarded as 100. The larger the value, the better.

Rim: 17×7J
Internal pressure: 200 kPa
Load: 4.08 kN
Running speed: 10 km/h
The test results, etc. are shown in Table 1.

TABLE 1

|  | Com. Ex. 1 | Com. Ex. 2 | Com. Ex. 3 | Ex. 1 | Ex. 2 | Ex. 3 |
| --- | --- | --- | --- | --- | --- | --- |
| Drawing showing structure of tread rubber | FIG. 25 | FIG. 26 | FIG. 25 | FIG. 5 | FIG. 6 | FIG. 7 |
| Manufacturing method of cap portion | Extrusion | Extrusion | Strip lamination | Strip lamination | Strip lamination | Extrusion |
| Manufacturing method of conductive portion | Extrusion | — | Extrusion | Strip lamination | Extrusion | Strip lamination |
| Manufacturing method of base portion | Extrusion | Extrusion | Strip lamination | Strip lamination | Strip lamination | Extrusion |
| Exposure width R of conductive portion (mm) | 2 | 0 | 2 | 2 | 2 | 2 |
| Electric resistance of tire ($\times 10^7 \Omega$) | 1.2 | Not less than 100 | 1.0 | 0.5 | 1.1 | 0.9 |
| Tire uniformity (index) | 100 | 105 | 98 | 110 | 107 | 106 |

As the results of the test, it could be confirmed that the tires of the Examples could suppress electric resistance to a low level without deteriorating the uniformity of the tire.

Next, a conduction failure ratio was measured as to pneumatic tires according to a specification shown in Table 2. In each Example, a silica-rich non-conductive rubber was used for the cap portion and the base portion, and a carbon-rich conductive rubber was used for the conductive portion (through-terminal portion). Formulations of these rubbers are common to all Examples. Everything is common to all tires, except parameters shown in Table 2. All portions of the tread rubber are formed of strip laminated bodies as shown in FIG. 5(*b*). For the conduction failure ratio, 200 tires were manufactured for each Example, and the electric resistance of fresh tires was measured according to the above-mentioned test method. In each Example, the number of tires showing an electric resistance value of not less than $1 \times 10^8 \Omega$ was counted, and the percentage thereof was obtained. The smaller the value, the better.

The test results, etc. are shown in Table 2.

manufactured, and electric resistance, rolling resistance and uniformity of each tire were measured. In each Example, a silica-rich non-conductive rubber was used for the cap portion and the base portion, and a carbon-rich conductive rubber was used for the conductive portion (through-terminal portion). Formulations of these rubbers are common to all Examples. Everything is common to all tires, except parameters shown in Table 3.

The rolling resistance was measured under the following conditions by using a rolling resistance tester. The results are shown by an index based on a result of Comparative Example 1 regarded as 100. The smaller the value, the smaller the rolling resistance and the better the rolling performance.

Rim: 17×7J

Inner pressure: 200 kPa

Load: 4.7 kN

Speed: 80 km/h

The test results and the like are shown in Table 3.

TABLE 2

| | Ex.4 | Ex.5 | Ex.6 | Ex.7 | Ex.8 | Ex.9 | Ex.10 | Ex.11 | Ex.12 | Ex.13 | Ex.14 | Ex.15 |
|---|---|---|---|---|---|---|---|---|---|---|---|---|
| Outer diameter D of conductive spew (mm) | None | None | None | 0.4 | 0.6 | 1 | 1.2 | 1.2 | 1.2 | 0.2 (*) | 0.4 | 1.2 |
| Width R of conductive portion (mm) | 1.5 | 1 | 0.5 | 1 | 1 | 1 | 1 | 1 | 1 | 1 | 1 | 0.5 |
| Distance x from center line of conductive portion to outermost position of spew (mm) | — | — | — | 0.2 | 0.3 | 0.5 | 0.6 | 1.1 | 1 | — | 1.1 | 0.6 |
| Number of conductive spews which are always in contact with ground during rotation of tire | — | — | — | 2 | 2 | 2 | 2 | 2 | 4 | — | 2 | 2 |
| Conduction failure ratio (%) | 0.5 | 1.0 | 3.5 | 0 | 0 | 0 | 0 | 0.5 | 0 | 0 | 0.5 | 0 |
| Value R/2 + D (mm) | — | — | — | 0.9 | 1.1 | 1.5 | 1.7 | 1.7 | 1.7 | — | 0.9 | 1.45 |

(*) Burr with 0.2 mm thickness extending continuously in circumferential direction of tire As the results of the test, it could be confirmed that in case of tires in which the conductive portion constituted a part of a protrusion such as a spew, the electric resistance could be surely made small even if the width of the conductive portion was set small.

Second Invention

Pneumatic tires (size: 215/45R17) which satisfy the second invention and have a base structure shown in Table 3 were

TABLE 3

| | Com. Ex. 1 | Com. Ex. 2 | Com. Ex. 3 | Ex. 16 | Ex. 17 | Ex. 18 |
|---|---|---|---|---|---|---|
| Drawing showing structure of tread rubber | FIG. 25 | FIG. 26 | FIG. 25 | FIG. 20 | FIG. 23 | — |
| Manufacturing method of cap portion | Extrusion | Extrusion | Strip lamination | Strip lamination | Strip lamination | Extrusion |
| Manufacturing method of conductive portion | Extrusion | — | Extrusion | Strip lamination | Extrusion | Strip lamination |
| Manufacturing method of base portion | Extrusion | Extrusion | Strip lamination | Strip lamination | Strip lamination | Strip lamination |
| Exposure width R of conductive portion (mm) | 2 | 0 | 2 | 2 | 2 | 2 |
| Electric resistance of tire ($\times 10^7 \Omega$) | 1.2 | Not less than 100 | 1.2 | 1.0 | 1.1 | 0.9 |
| Rolling resistance (index) | 100 | 100 | 100 | 102 | 102 | 100 |
| Tire uniformity (index) | 100 | 105 | 98 | 110 | 108 | 106 |

What is claimed is:

1. A pneumatic tire comprising a toroidal carcass extending from a tread portion to bead cores in bead portions through sidewall portions, a tread reinforcing cord layer disposed radially outward of the carcass in the tread portion and electrically conducted with a rim when the tire is mounted on the rim, and a tread rubber disposed radially outward of the tread reinforcing cord layer, the tread rubber including:
a base portion made of a non-conductive rubber containing silica and disposed radially outward of the tread reinforcing cord layer,
a cap portion made of a non-conductive rubber containing silica and disposed radially outward of the base portion to form a ground-contacting surface, and
a conductive portion made of a conductive rubber and having one end exposed on the ground-contacting surface and the other end connected to the tread reinforcing cord layer,
wherein the base portion is formed by spirally winding a ribbon-like rubber strip continuously from one tread edge side to the other tread edge side without interruption and a gap portion is formed by separating side edges of adjacent rubber strips during the winding to expose the tread reinforcing cord layer at the gap portion, the gap portion being formed in such a manner that the rubber strip is locally bent,
the cap portion is divided into right and left parts and comprises a first cap portion on one tread edge side and a second cap portion on the other tread edge side, and
the conductive portion extends radially inwardly between the first cap portion and the second cap portion from the ground-contacting surface and is connected to the tread reinforcing cord layer at the gap portion of the base portion.

2. The pneumatic tire of claim 1, wherein the gap portion includes a portion in which the rubber strip is wound at a winding pitch which is larger than the width of the rubber strip but not larger than two times the width of the rubber strip.

3. The pneumatic tire of claim 1, wherein the conductive portion is made of a strip laminated body formed by spirally winding a ribbon-like rubber strip.

4. The pneumatic tire of claim 1, wherein the first cap portion and the second cap portion are made of a strip laminated body formed by spirally winding a ribbon-like rubber strip.

5. The pneumatic tire of claim 1, wherein the tread rubber has a protrusion on the ground-contacting surface, the protrusion including any of a spew sucked up into a vent hole of a mold during vulcanization and formation, a spew resection mark that a part of the spew has been resected, and a burr sucked up into between divided surfaces of the mold, and the conductive portion constitutes at least a part of the protrusion.

6. The pneumatic tire of claim 5, wherein the protrusion included in the conductive portion is the spew or the spew resection mark, and at least two protrusions are always present in a ground contacting region when the tire is mounted on a normal rim and inflated to a normal pressure and the tire in such a normal condition is loaded with a normal load and is rotated on a flat surface at a camber angle of 0°.

7. A method for manufacturing a pneumatic tire having a tread reinforcing cord layer electrically conducted with a rim when the tire is mounted on the rim, and a tread rubber disposed radially outward of the tread reinforcing cord layer, the method comprising:

a tread rubber forming step for forming a tread rubber, and
a vulcanizing step for vulcanizing a raw tire including the tread rubber,
the tread rubber forming step comprising:
a stage for forming a base portion having a gap portion by spirally winding a ribbon-like non-conductive rubber strip containing silica around a radially outer side of the tread reinforcing cord layer continuously from one tread edge side to the other tread edge side without interruption and separating side edges of adjacent rubber strips by locally bending the rubber strip during the winding to form the gap portion at which the tread reinforcing cord layer is exposed,
a stage for forming a first cap portion made of a non-conductive rubber containing silica radially outward of the base portion to extend from its axially outer end located on one end side of the base portion to near the gap portion so as to cover a region of the one end side of the base portion,
a stage for forming a conductive portion made of a conductive rubber along an inner end portion of the first cap portion so as to have one end exposed on a ground-contacting surface and the other end connected to the tread reinforcing cord layer through the gap portion of the base portion, and
a stage for forming a second cap portion made of a non-conductive rubber containing silica on an outer side of the base portion in a tire width direction and in a region of the other end side extending from the conductive portion to the other tread edge side.

8. The method of claim 7, wherein the stage for forming the conductive portion is carried out by spirally winding a ribbon-like rubber strip.

9. The method of claim 7, wherein the stage for forming the conductive portion is carried out by winding a rubber sheet having a width which is continuous from said one end to said the other end of the conductive portion.

10. The method of claim 7, wherein the stages for forming the first cap portion and the second cap portion are carried out by spirally winding a ribbon-like rubber strip.

11. The method of claim 7, wherein the vulcanizing step is carried out using a mold having a vent hole, and the vulcanizing step includes a step for sucking up a part of the conductive portion into the vent hole by conducting the vulcanizing in a state that at least a part of the conductive portion appearing on the ground-contact surface faces the vent hole of the mold.

12. The method of claim 7, wherein the vulcanizing step is carried out using a mold having divided surfaces, and the vulcanizing step includes a step for sucking up a part of the conductive portion into a gap between the divided surfaces by conducting the vulcanizing in a state that at least a part of the conductive portion appearing on the ground-contacting surface faces the divided surfaces.

* * * * *